United States Patent
Lazar

(10) Patent No.: US 10,999,560 B2
(45) Date of Patent: May 4, 2021

(54) REMOTE ELECTRONIC MONITORING INFRASTRUCTURE

(71) Applicant: Readiness Systems, LLC, Portland, OR (US)

(72) Inventor: Richard A. Lazar, Portland, OR (US)

(73) Assignee: Readiness Systems, LLC, Portland, OR (US)

( * ) Notice: Subject to any disclaimer, the term of this patent is extended or adjusted under 35 U.S.C. 154(b) by 0 days.

(21) Appl. No.: 16/180,689

(22) Filed: Nov. 5, 2018

(65) Prior Publication Data

US 2019/0141295 A1  May 9, 2019

Related U.S. Application Data

(60) Provisional application No. 62/582,633, filed on Nov. 7, 2017.

(51) Int. Cl.
*H04N 7/18* (2006.01)
*G06F 9/38* (2018.01)
*H04N 1/00* (2006.01)
*H04W 4/70* (2018.01)
*G06F 11/30* (2006.01)

(52) U.S. Cl.
CPC .......... *H04N 7/183* (2013.01); *G06F 9/3802* (2013.01); *G06F 11/3013* (2013.01); *G06F 11/3055* (2013.01); *H04N 1/00212* (2013.01); *H04N 1/00244* (2013.01); *H04W 4/70* (2018.02); *H04N 7/188* (2013.01); *H04N 2201/0084* (2013.01)

(58) Field of Classification Search
None
See application file for complete search history.

(56) References Cited

U.S. PATENT DOCUMENTS

| | | | |
|---|---|---|---|
| 2003/0107648 A1* | 6/2003 | Stewart | G08B 13/19645 348/143 |
| 2004/0105006 A1* | 6/2004 | Lazo | G07C 9/28 348/169 |
| 2012/0242851 A1* | 9/2012 | Fintel | H04N 5/23222 348/221.1 |
| 2014/0286644 A1 | 9/2014 | Oshima et al. | |
| 2015/0005935 A1* | 1/2015 | Bae | G06F 19/3462 700/241 |

(Continued)

FOREIGN PATENT DOCUMENTS

WO    WO2019094397    5/2019

OTHER PUBLICATIONS

PCT/US2018/059500/ filed Nov. 6, 2018, 114 pages.

(Continued)

*Primary Examiner* — Clifford Hilaire
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more computing devices to facilitate and/or support one or more operations and/or techniques for remote electronic monitoring infrastructure, such as implemented, at least in part, via electronic communications, which may include, for example, enhanced machine-type communications (eMTC).

36 Claims, 7 Drawing Sheets

(56) References Cited

U.S. PATENT DOCUMENTS

| | | | |
|---|---|---|---|
| 2015/0356359 A1* | 12/2015 | Kawasaki | G06K 9/2054 |
| | | | 382/104 |
| 2016/0117635 A1* | 4/2016 | Parker | G06Q 20/203 |
| | | | 705/28 |
| 2016/0379176 A1 | 12/2016 | Brailovskiy et al. | |
| 2018/0054795 A1* | 2/2018 | Edge | H04W 4/70 |

OTHER PUBLICATIONS

PCT/US2018/059500/ International Search Report, dated Feb. 19, 2019, 3 pages.
PCT/US2018/059500/ Written Opinion, dated Feb. 19, 2013, 10 pages.
International Preliminary Report on Patentability, International Patent Application No. PCT/US2018/059500, dated May 12, 2020, 1 pg.
International Search Report, International Patent Application No. PCT/US2018/059500, dated Feb. 19, 2019, 3 pgs.
Written Opinion of the International Searching Authority, International Patent Application No. PCT/US2018/059500 dated Feb. 19, 2019, 10 pgs.
Publication of International Patent Application No. PCT/US2018/059500, dated May 16, 2019, 114 pgs.

\* cited by examiner

REMOTE ELECTRONIC MONITORING INFRASTRUCTURE

CROSS-REFERENCE TO RELATED APPLICATIONS

This application claims the benefit of and priority to U.S. Provisional Patent Application Ser. No. 62/582,633, entitled "REMOTE ASSET MONITORING VIA ELECTRONIC COMMUNICATIONS," filed on Nov. 7, 2017, which is assigned to the assignee hereof and which is expressly incorporated herein by reference.

BACKGROUND

Field

The present disclosure relates generally to electronic monitoring systems and, more particularly, to remote electronic monitoring infrastructure, such as implemented, at least in part, via electronic communications, which may include, for example, enhanced machine-type communications (eMTC).

2. Information

In some instances, particular ssets, such as electronic devices that may be part of critical and/or safety infrastructure, for example, may require proper and/or timely determinations with respect to their operating state, conditions, readiness, maintenance, etc., such as to ensure that these devices are in proper working order. In addition, at times, particular electronic devices may also require meeting applicable regulatory and/or manufacturers' standards, such as for proper device certification, registration, maintenance, deployment, or the like. As an example, one such device may comprise an automated external defibrillator (AED). Typically, AEDs are electronic cardiovascular devices capable of cardiac rhythm analysis and/or defibrillation, such as after electronically detecting the presence of ventricular fibrillation. AEDs are regulated by the U.S. Food and Drug Administration (FDA) and designed to be placed and/or stored in enclosures, such as wall-mounted cabinets, for example, at publicly-accessible locations so as to timely treat sudden cardiac arrest (SCA), such as via delivering a measured electrical shock to the heart to restore its natural rhythm.

To be effective, AEDs must function properly when needed. Thus, to ensure readiness and/or proper operation, AEDs may comprise internal electronics and/or circuitry capable of performing self-tests of associated electronic components, a battery energy level, electrode condition, or the like. In some instances, AEDs may comprise a readiness or like display or panel having one or more visual status indicators (VSIs), such as in the form of light-emitting diode (LED), liquid-crystal display (LCD), or like lights so as to visually indicate an AED's status, including detected faults, conditions, errors, etc. For example, VSIs may indicate whether internal electronics and/or circuitry of a particular AED have detected an internal component problem, whether a battery has insufficient energy level, whether electrodes are ready for use, or the like, such as via flashing, blinking, illuminating, changing colors, turning on or off, etc. one or more VSIs, displaying one or more icons, error messages, or the like. AEDs may also include one or more accessories, such as batteries, electrodes, pads, or the like that may typically have expiration dates before which they must be replaced.

As was indicated, proper maintenance, such as scheduled, corrective, etc. of AEDs or like electronic devices, such as identified and/or indicated via internal electronics and/or circuitry in connection with a readiness display or panel, for example, may depend, at least in part, on proper and/or timely determinations with respect to their operating conditions, identified faults, etc. Certain AED studies observed, however, that many AEDs remain unattended and/or unmaintained despite a visible warning, such as via a VSI flashing, blinking, turning off, etc. so as to convey that a particular AED needs attention. In addition, certain AED studies also observed that a significant number of AED accessories, such as batteries, electrodes, pads, etc. remain installed well beyond their expiration dates. In some instances, this may lead to an increased risk of AED failure. At times, proper maintenance of AEDs may also involve, for example, keeping track of manufacturers' recalls, implementing software updates, keeping records of uses, maintenance procedures, conducted inspections, or the like. Accordingly, how to implement more effective and/or more efficient remote electronic monitoring infrastructure, such as to facilitate and/or support timely determinations regarding status and/or proper maintenance of particular assets, such as electronic devices that may be part of critical and/or safety infrastructure, for example, continues to be an area of development.

BRIEF DESCRIPTION OF THE DRAWINGS

Claimed subject matter is particularly pointed out in the concluding portion of the specification. However, both as to organization and/or method of operation, together with objects, features, and/or advantages thereof, it may best be understood by reference to the following detailed description if read with the accompanying drawings in which:

Figure 1:
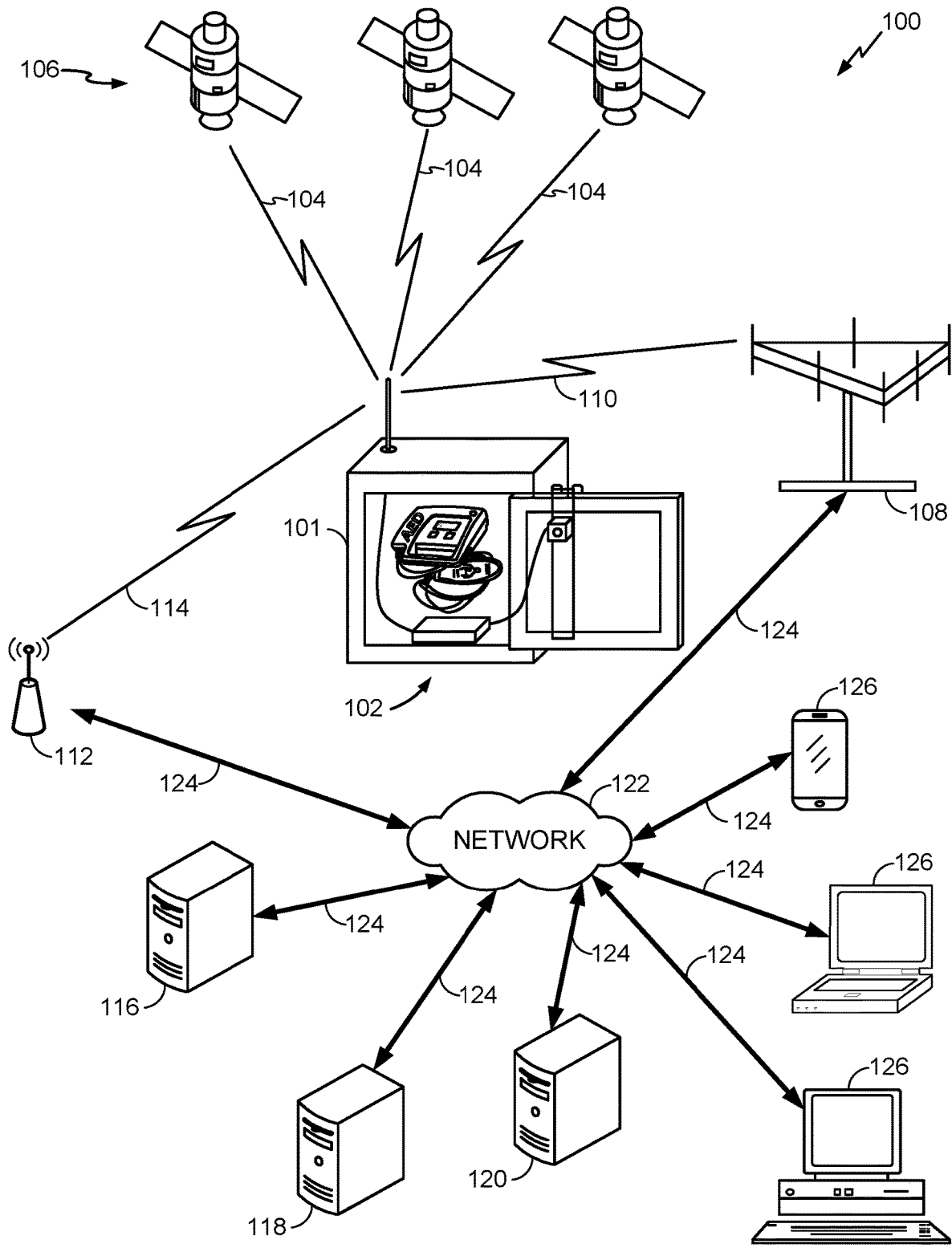
FIG. 1 is a schematic diagram illustrating features associated with an implementation of an example operating environment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for remote electronic monitoring infrastructure, such as implemented via one or more electronic communications and/or one or more computing and/or communications networks and/or protocols (e.g., network protocols) discussed herein. For example, as will be seen, in some instances, one or more operations and/or techniques for remote electronic monitoring infrastructure may be implemented, at least in part, via one or more enhanced machine-type communications (eMTC), such as utilizing a machine-type category M1 (Cat-M1) device, just to illustrate one possible implementation. For purposes of explanation, Release 13 of the 3rd Generation Partnership Project (3GPP) standard introduced eMTC as a suite of narrowband technologies capable of more efficiently and/or more effectively supporting lower data-rate applications, such as while coexisting with currently deployed Long Term Evolution (LTE) Advanced infrastructure, spectrum, and/or devices. As was indicated, as one illustrative example, a particular narrowband technology in Release 13 included a Cat-M1 device comprising a wireless receiver and/or transmitter capable of processing LTE or like signals, such as to facilitate and/or support wireless communications, positioning, or the like.

Typically, although not necessarily, to facilitate and/or support one or more operations and/or techniques for remote electronic monitoring infrastructure, a Cat-M1 device may employ a narrowband receiver of about 1.4 MHz, for example, but, in some instances, may operate within an LTE carrier environment of up to a 20 MHz operational bandwidth. As such, a Cat-M1 device may, for example, be deployed in LTE or like network (e.g., LTE Advanced, etc.) and/or spectrum and, thus, may more efficiently and/or more effectively coexist with mobile or other broadband services, such as those currently in operative use. As a way of illustration, at times, to facilitate and/or support one or more operations and/or techniques for remote electronic monitoring infrastructure, a Cat-M1 device may, for example, leverage legacy LTE synchronization signals (e.g. primary, secondary, etc.), while introducing new control and/or communication channels that may be more efficient and/or more effective for lower bandwidth operations. As such, here, a Cat-M1 device may be capable of supporting an LTE or like network, for example, and/or may utilize multiple narrowband regions with frequency retuning, such as to enable scalable resource allocation, frequency hopping for diversity across an entire LTE or like band, or the like. It should be noted, however, that these are merely examples relating a particular device, network, technology, etc., and that claimed subject matter is not so limited. For example, in some instances, a narrowband IoT (NB-IoT) device, such as utilizing 200 kHz bandwidth in LTE, as one possible example, may also be utilized herein, in whole or in part, to facilitate and/or support one or more operations and/or techniques for remote electronic monitoring infrastructure, such as in a similar or like fashion and/or without deviating from the scope of claimed subject matter, Particular examples of eMTC or like communications, such as utilizing a Cat-M1 device to facilitate and/or support one or more operations and/or techniques for remote electronic monitoring infrastructure in connection with one or more implementations will be discussed in greater detail below.

As discussed herein, one or more operations and/or techniques for remote electronic monitoring infrastructure may, for example, be implemented, in whole or in part, to facilitate and/or support electronic monitoring of particular assets, such as one or more assets that may be part of critical and/or safety infrastructure, for example. As used herein, "electronic asset," "monitored asset," or simply "asset" refers to an electronic device having electronics and/or circuitry capable of determining its operating state or status and/or indicating its operating state or status, such as via one or more status indicators. For example, as mentioned above, in some instances, an asset may comprise an AED, and a status indicator may comprise a VSI, just to illustrate one possible implementation. Typically, an AED is an electronic cardiovascular device designed to be placed and/or stored in an enclosure, such as a wall-mounted or free-standing cabinet, for example, at publicly-accessible locations so as to be used to treat SCA, such as by members of the public, trained or otherwise. An AED enclosure may typically, although not necessarily, comprise, for example, a weather and/or elements-resistant metal, wooden, fiberglass, or like container, such as a box or cabinet having a glass or like see-through window, door, or the like. As was also indicated, AEDs may, for example, comprise a readiness display or panel having one or more VSIs, such as in the form of one or more LED, LCD, or like lights so as to indicate AEDs' operating state or status, which may include operating state or status of AED's accessories. For example, VSIs may indicate whether a particular AED has detected an internal component problem or fault, whether a battery has insufficient energy level, whether electrodes and/or pads are ready for use, or the like, such as via flashing, blinking, illuminating, turning on or off, etc. one or more VSIs. In some instances, to indicate an operating state or status of an AED, a VSI may comprise, for example, one or more colored lights (e.g., red, green, etc.) and/or visual icons. Of course, these are merely examples of particular VSIs, and claimed subject matter is not so limited.

As alluded to previously, readiness of an electronic asset, such as its ability to be successfully deployed as needed may, for example, depend, at least in part, on its proper and/or timely maintenance, which, in turn, may depend, at least in part, on proper and/or timely determinations with respect to the asset's operating state or status. Unfortunately, certain studies suggest that a larger number of particular assets, such as electronic devices that may be part of critical and/or safety infrastructure, for example, remain unattended and/or unmaintained despite a visible warning that the devices need attention, as also indicated above. As a way of illustration, again, using an AED as an example, since these electronic devices are typically stored in enclosures and used relatively infrequently, their operating state or status, including error messages, fault indications, etc., such as indicated via VSIs, for example, may go unnoticed for quite some time, which, again, may lead to an increased risk of AED failure.

In some instances, to at least partially address these and/or like issues, a number of optical receivers may be placed or positioned inside an AED enclosure, such as part of an AED monitoring system, for example, but may be operationally-expensive, time-consuming, labor-intensive, and/or error-prone. For example, since optical receivers comprise light-sensitive devices, for suitable and/or proper operation, they may need to be positioned in a sufficiently close proximity to VSIs, such as in order to receive and/or process emitted light. At times, a particular optical receiver may also need to correspond to and/or be precisely aligned with an individual VSI light, such as in order to detect light and/or a change in light intensity indicative of an AED status, for example, meaning that a distance between each optical receiver may need to match a distance between each VSI. As a result, in some instances, for suitable and/or proper system operation, a plurality of aligned, matching, etc. optical receiver-VSI pairs may need to be employed, which, again, may be operationally-expensive and/or error-prone.

In addition, for suitable and/or proper system operation, optical receivers may need to be positioned in a sufficiently dark area, such as in an area with no substantial interference from external light sources in order to receive sufficient illumination from VSIs, for example. Ambient or natural light coming in through glass or like see-through doors, windows, etc. of typical AED enclosures, however, may prevent or preclude optical receivers from receiving sufficient illumination from corresponding VSIs. Also, ambient light conditions inside an RED enclosure with a see-through door, window, etc. may differ significantly throughout the day, such as, for example, very dark at night, less dark in the morning, much brighter during daytime, or the like. As such, absent proper, tailored, and/or, at times, separate calibration of individual optical receivers for different light intensities relative to each time of day (e.g., morning, noon, mid-day, evening, etc.), for example, optical receivers may prove to be ineffective and/or inoperable. Further, for particular assets, such as AEDs that turn their VSIs off to indicate an issue or problem, such as instead of or in addition to flashing, blinking, illuminating, etc., for example, lack of incoming optical signals from turned off VSIs may prevent optical receivers from converting the signals (e.g., absorbable photons, etc.) into a requisite electrical domain, thus, again, limiting or precluding their proper and/or suitable operation. Accordingly, it may be desirable to develop one or more methods, systems, and/or apparatuses that may implement more effective and/or more efficient remote electronic monitoring infrastructure so as to facilitate and/or support proper and/or timely determinations with respect to an operating state or status of particular assets, such as electronic devices that may be part of critical and/or safety infrastructure, for example.

Thus, as will be discussed in greater detail below, in an implementation, one or more signals representative of digital media captured via a camera imager or like functionality of an electronic asset monitoring system may, for example, be generated. As will be seen, in some instances, digital media may, for example, be captured in connection with a particular image capture event and may be based, at least in part, on a timing sequence determined for one or more status indicators of a particular monitored asset. As also discussed below, at times, digital media may, for example, be captured in connection with monitoring one or more streams of applicable signal sample values and determining one or more changes within such values that may be indicative of a particular image capture event. One or more signals representative of captured digital media may be analyzed and/or communicated to a suitable server, and an operating condition or status of a monitored asset may, for example, be determined, such as via one or more appropriate processing techniques. Based, at least in part, on a determined operating condition or status, one or more signals representative of electronic notifications may, for example, be generated and transmitted to one or more appropriate electronic devices, such as via an electronic communications network. In turn, based, at least in part, on these or like of electronic notifications, one or more appropriate operations and/or processes may, for example, be implemented and/or performed, such as to facilitate and/or support readiness and/or proper operation of a particular asset.

FIG. 1 is a schematic diagram illustrating features associated with an implementation of an example operating environment 100 capable of facilitating and/or supporting one or more operations and/or techniques for remote electronic monitoring infrastructure, such as implemented via one or more electronic communications, at least in part. As will be seen, in some instances, one or more electronic communications may include, for example, enhanced machine-type communications (eMTC) utilizing an eMTC category M1 (Cat-M1) device. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), WWAN, wireless local area networks (WLAN, etc.), or the like. It should also be noted that claimed subject matter is not limited to indoor implementations (e.g., AEC enclosures located in buildings, rooms, etc.). For example, at times, one or more operations and/or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations and/or techniques described herein may be performed, at least in part, in an outdoor environment.

Thus, as illustrated, example operating environment 100 may include, for example, an electronic asset that may be placed and/or stored in an enclosure 101, such as a cabinet, as one possible example, which, in some instances, may comprise and/or be part of an electronic asset monitoring system, referenced herein generally at 102. It should be noted that, at times, enclosure 101 may comprise an aspect or feature of example operating environment 100 that may be separate from electronic asset monitoring system 102. As seen, in an implementation, electronic asset monitoring system 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, electronic asset monitoring system 102 may, for example, transmit wireless signals to and/or receive wireless signals from any suitable wireless communications network. In one example, electronic asset monitoring system 102 may communicate with a cellular communications network, such as by transmitting wireless signals to and/or receiving wireless signals from one or more wireless transmitters capable of transmitting and/or receiving wireless signals, such as a base station transceiver 108 over a wireless communication link 110, for example. As was indicated, in some instances, one or more communications may be implemented, at least in part, via a Cat-M1 device. Similarly, electronic asset monitoring system 102 may transmit wireless signals to and/or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, access transceiver devices, or the like, depending on an implementation. Similarly, local transceiver 112 may comprise, for example, a wireless transmitter and/or receiver capable of transmitting and/or receiving wireless signals. For example, at times, wireless transceiver 112 may be capable of transmitting wireless signals to and/or receiving wireless signals from one or more other terrestrial or like transmitters.

In a particular implementation, local transceiver 112 may be capable of communicating with electronic asset monitoring system 102 at a shorter range over wireless communication link 114 than at a range established via base station transceiver 108 over wireless communication link 110. For example, local transceiver 112 may be positioned in an indoor or like environment and may provide access to a wireless local area network (WILAN, e.g., IEEE Std. 802.11 network, etc.), wireless personal area network (WPAN, e.g., Bluetooth® network, etc.), or the like. In another example implementation, local transceiver 112 may comprise, for example, a femtocell or picocell capable of facilitating communication via link 114 according to an applicable wireless communication protocol. Of course, it should be understood that these are merely examples of networks that may communicate with electronic asset monitoring system 102 over a wireless link, and claimed subject matter is not limited in this respect. For example, in some instances, operating environment 100 may include a larger number of base station transceivers 108, local transceivers 112, etc.

In an implementation, base station transceiver 108, local transceiver 112, etc. may communicate with servers 116, 118, or 120 over a network 122 via one or more links 124.

Network 122 may comprise, for example, any combination of wired and/or wireless communication links. In a particular implementation, network 122 may comprise, for example, Internet Protocol (IP)-type infrastructure capable of facilitating or supporting communication between electronic asset monitoring system 102 and one or more servers 116, 118, 120, etc. via local transceiver 112, base station transceiver 108, etc., or any combination thereof In another implementation, network 122 may comprise, for example cellular communications network infrastructure, such as a base station controller or master switching center to facilitate and/or support mobile cellular communication with electronic asset monitoring system 102. Servers 116, 118, and/or 120 may comprise any suitable servers or combination thereof capable of facilitating or supporting one or more operations and/or techniques discussed herein.

For example, servers 116, 118, and/or 120 may comprise one or more computing and/or communication devices capable of implementing one or more processing operations and/or techniques, analytics and/or content-rendering operations and/or techniques, positioning assistance operations and/or techniques, navigation operations and/or techniques, network-related operations and/or techniques, or the like. As a way of illustration, as will also be seen, servers 116, 118, and/or 120 may, for example, be capable of receiving and/or storing one or more signals representative of digital media captured via a camera imager or like functionality of electronic asset monitoring system 102, processing these or like one or more signals via one or more appropriate techniques, generating one or more signals representative of electronic notifications, communicating these or like electronic notifications to one or more appropriate electronic devices, or the like. In some instances, servers 116, 118, and/or 120 may, for example, be capable of receiving and/or storing operating conditions or states of a monitored asset, appropriate customer, owner, distributor, etc. information, or the like.

At times, servers 116, 118, and/or 120 may, for example, facilitate and/or support one or more suitable web portals or like on-line properties, such as a customer portal for monitored assets, distributor portal for tracking customers, accessories, etc., administrative and/or management portal, or the like. Depending on an implementation, a particular portal may comprise, for example, a number of permissions layers, such as for administrative, subscriber, distributor, or like users, just to name a few, Administrative users, subscribers, distributors, etc. may, for example, manage assets, accounts, etc. such as via a web-based browser or like application or process that may enable a particular user to access and/or view electronic content located on servers 116, 118, and/or 120, such as directly and/or via network 122, just to illustrate one possible implementation. In some instances, servers 116, 118, and/or 120 may, for example, facilitate and/or support one or more suitable application program interfaces (APIs), such as for one or more technology or like partners to integrate into one or more operations and/or techniques for remote electronic monitoring infrastructure associated with operating environment 100. APIs may be implemented in any suitable manner, such as to allow applicable electronic content (e.g., digital media, customer information, asset status, etc.) to be appropriately synchronized with one or more parties (e.g., a third-party subscriber, eta), asset and/or accessory tracking system, partner database, or the like.

In particular implementations, electronic asset monitoring system 102 may comprise, for example, circuitry and/or processing resources capable of determining a position fix or estimated location of electronic asset monitoring system 102. For example, if satellite signals 104 are available, electronic asset monitoring system 102 may compute a position fix based, at least in part, on pseudorange measurements to four or more SPS satellites 106. Here, electronic asset monitoring system 102 may compute such pseudorange measurements based, at least in part, on pseudonoise code phase detections in signals 104 acquired from four or more SPS satellites 106. In particular implementations, electronic asset monitoring system 102 may receive from one or more servers 116, 118, or 120 positioning assistance data to aid in the acquisition of signals 104 transmitted by SPS satellites 106 including, for example, almanac, ephemeris data, Doppler search windows, just to name a few examples.

In some implementations, electronic asset monitoring system 102 may obtain a position fix by processing wireless signals received from one or more terrestrial transmitters positioned at known locations (e.g., base station transceiver 108, local transceiver 112, etc.) using any one of several techniques, such as, for example, Observed Time Difference of Arrival (OTDOA), Advanced Forward Link Trilateration (AFLT), or the like. In these or like techniques, a range from electronic asset monitoring system 102 may, for example, be measured to three or more of terrestrial transmitters based, at least in part, on one or more positioning reference signals (PRS) transmitted by these transmitters and received at electronic asset monitoring system 102. Here, servers 116, 118, or 120 may be capable of providing suitable positioning assistance data to electronic asset monitoring system 102 including, for example, OTDOA reference transmitter data, OTDOA neighbor transmitter data, reference signal time difference (RSTD) search window, quality of service (QoS) parameters, PRS configuration parameters, locations, identities, orientations, etc. of terrestrial transmitters to facilitate and/or support one or more applicable positioning techniques (e.g., AFLT, OTDOA, etc.). At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

As alluded to previously, in particular environments, such as indoor or like environments (e.g., urban canyons, etc.), electronic asset monitoring system 102 may not be capable of acquiring and/or processing signals 104 from a sufficient number of SPS satellites 106 so as to perform a suitable positioning technique. Thus, optionally or alternatively, electronic asset monitoring system 102 may, for example, be capable of determining a position fix based, at least in part, on signals acquired from one or more local transmitters, such as femtocells, Wi-Fi access points, or the like. For example, electronic asset monitoring system 102 may obtain a position fix by measuring ranges to three or more local transceivers 112 positioned at known locations. In some implementations, electronic asset monitoring system 102 may, for example, measure ranges by obtaining a Media Access Control identifier (MAC ID) address or like identifier from wireless signals received from local transceiver 112, base station transceiver 108, etc. and measuring one or more characteristics of received signals, such as signal strength, round trip delay, or the like.

As was indicated, in an implementation, electronic asset monitoring system 102 may, for example, receive positioning assistance data (e.g., OTDOA, AFLT assistance data, etc.) for one or more positioning operations from servers 116, 118, and/or 120. At times, positioning assistance data may include, for example, locations, identities, orientations, PRS configurations, etc. of one or more local transceivers 112, base station transceivers 108, etc. positioned at known locations for measuring ranges to these transmitters based, at least in part, on return trip time (RTT), time of arrival (TOA), time difference of arrival (TDOA), or like approaches, or any combination thereof. In some instances, positioning assistance data may include, for example, radio heat maps, context parameter maps, routeability graphs, etc., just to name a few examples. Other assistance data received by electronic asset monitoring system 102 may include, for example, electronic digital maps of indoor or like areas for display or to aid in navigation, such as for a proximate user seeking a location of electronic asset monitoring system 102. For example, based, at least in part, on positioning assistance data, electronic asset monitoring system 102 may communicate with a mobile device co-located with a user (e.g., a first responder, security personnel, etc.) so as to guide the user to electronic asset monitoring system 102 (e.g., via a map displayed on an electronic device, mobile device, etc.), A map may be provided to such a user, such as displayed via a user interface, as one possible example, as the user enters a particular area, such as an area proximate to asset monitoring system 102, for example, and may show applicable features such as doors, hallways, entry ways, walls, etc., points of interest, such as bathrooms, pay phones, room names, stores, or the like, such as in addition to a location of asset monitoring system 102. Via a digital map of an indoor or like area of interest, electronic asset monitoring system 102 may, for example, be capable of overlaying its current location over the displayed map of the area so as to provide an associated user with additional context, frame of reference, or the like.

According to an implementation, electronic asset monitoring system 102 may access positioning assistance data via servers 116, 118, and/or 120 by, for example, requesting such data through selection of a universal resource locator (URL). In particular implementations, servers 116, 118, and/or 120 may be capable of providing positioning assistance data to cover many different areas including, for example, floors of buildings, wings of hospitals, terminals at an airport, portions of a university campus, areas of a shopping mall, etc., just to name a few examples. In some instances, one or more servers 116, 118, and/or 120 may facilitate and/or support searching for and/or measuring PRS from one or more applicable wireless transmitters (e.g., local transceiver 112, base station transceiver 108, etc.) and/or performing RSTD or like measurements, such as for determining a position fix in connection with OTDOA or like positioning, for example, utilizing a Cat-M1 device that may be associated with electronic asset monitoring system 102, and may provide the position fix to electronic asset monitoring system 102.

Even though a certain number of computing platforms and/or devices are illustrated herein, any number of suitable computing platforms and/or devices may be implemented to facilitate and/or support one or more techniques and/or processes associated with operating environment 100. For example, at times, example operating environment 100 may include one or more computing devices, mobile or otherwise, illustrated generally at 126, which may be associated with one or more owners, administrative users, system subscribers, distributors, etc. of a monitored asset, accessory, etc. As was indicated, one or more servers (e.g., 116, 118, 120, etc.), having processed received digital media to determine a status of a particular monitoring asset, such as monitored via electronic asset monitoring system 102, for example, may generate and/or transmit one or ore appropriate electronic notifications or alerts to one or more computing devices 126, such as via one or more links 124. Also, at times, network 122 may be coupled to one or more wired or wireless communications networks (e.g., WLAN, etc.) so as to enhance a coverage area for communications with electronic asset monitoring system 102, one or more base station transceivers 108, local transceiver 112, servers 116, 118, 120, or the like. In some instances, network 122 may facilitate and/or support femtocell-based operative regions of coverage, for example. In addition, at times, one or more communication links 110, 114, 124, etc. may comprise, for example, wired communication links or any combination of wired and wireless communication links. Again, these are merely example implementations, and claimed subject matter is not limited in this regard.

Figure 2:
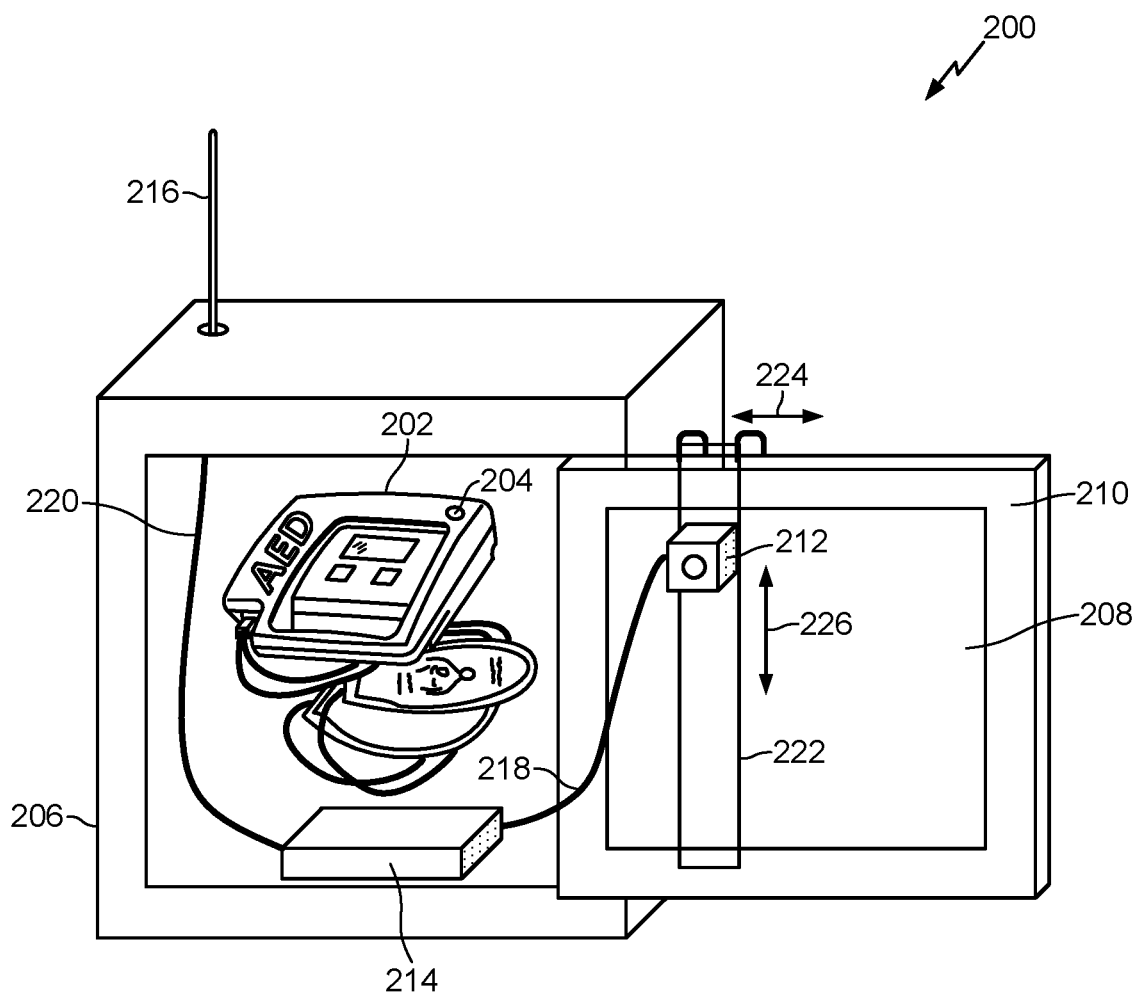
FIG. 2 a schematic diagram illustrating an implementation of an example electronic asset monitoring system.

Referring now to FIG. 2, which is an implementation of an example electronic asset monitoring system 200 that may be utilized, in whole or in part, to facilitate and/or support one or more operations and/or techniques for remote electronic monitoring infrastructure, such as implemented via one or more electronic communications, which may include eMTC Cat-M1 device communications, for example. In some instances, electronic asset monitoring system 200 may, for example, be associated with operating environment 100 of FIG. 1, Thus, at times, electronic asset monitoring system 200 may comprise and/or be representative of electronic asset monitoring system 102 of FIG. 1, for example, though claimed subject matter is not so limited. Further, as seen in this particular example implementation, in some instances, a monitored asset may comprise, for example, an electronic cardiovascular device, such as an AED, referenced herein at 202, having a status indicator, such as a VSI, referenced herein at 204.

As was indicated, in some instances, AED 202 may, for example, be placed and/or stored in a suitable enclosure, such as an AED cabinet 206 having a glass or like see-through insert or window 208 suitably positioned within a cabinet door 210. It should be noted that AED cabinet 206 may or may not be part of electronic asset monitoring system 200. As was also discussed, VSI 204 may comprise, for example, an LED, LCD, or like light, icon, etc., so as to denote or indicate an operating state or status of AED 202, such as a battery energy level, electronics faults, electrode condition, AED readiness, etc. via blinking, illuminating, turning on or off, etc. VSI 204. It should be noted that, even though references to a particular asset, such as an AED, for example, are made throughout the present specification, such as for ease of discussion, any other suitable asset, or any combination thereof, may be utilized herein, in whole or in part, such as in a similar fashion. For example, in some instances, a monitored asset may comprise an electronic fire protection device, such as a fire extinguisher, smoke detector, or the like having internal electronics and/or circuitry capable of performing self-tests of associated electronic components and/or indicating its operating state or status, such as via one or more status indicators. As such, claimed subject matter should not be limited to particular devices, systems, components, etc. illustrated and/or discussed.

Thus, as seen in this particular example, electronic asset monitoring system 200 may comprise a plurality of components, such as, for example, a camera assembly 212, a communications assembly 214, and an antenna assembly 216, just to illustrate one possible implementation. In some instances, components of electronic asset monitoring system 200 may, for example, be operatively and/or communicatively coupled via one or more communication links. For example, as seen, here, communications assembly 214 may be coupled to camera assembly 212 via a communication link 218, and to antenna assembly 216 via a communication link 220. Although not shown, in some instances, camera assembly 212 may, for example, be operatively and/or communicatively coupled to antenna assembly 216 directly, such as via an applicable communication link. Communication links, such as links 218 and/or 220, for example, may comprise wired and/or wireless communication links, or any combination thereof. In a particular implementation, communication links, such as links 218 and/or 220, for example, may comprise universal asynchronous receiver-transmitter (UART), universal synchronous and asynchronous receiver-transmitter (USART), or like cabling, though claimed subject matter is not so limited. For example, in some instances, one or more communications between components of electronic asset monitoring system 200 may include a wired and/or wireless power transfer, such as to power one or more applicable components, which may be implemented via a low power industrial, scientific, and medical (ISM) band or like radio spectrum, just to illustrate another possible implementation. Again, claimed subject matter is not limited to a particular communication, band, link, etc.

In an implementation, camera assembly 212 may, for example, be suitably installed or mounted on AED cabinet 206, such as via any suitable technique. For example, as illustrated, here, camera assembly 212 may be installed or mounted inside AED cabinet 206, such as via a camera mounting system, referenced herein via a hanger at 222. Claimed subject matter is not so limited, of course. For example, at times, a magnet, adhesive tape, or the like, or any combination thereof, may be employed herein, in whole or in part, to suitably install or mount camera assembly 212, inside AED cabinet 206 or otherwise. As a way of illustration, another implementation of a camera mounting system that may be used, at least in part, to install or mount camera assembly 212 on AED cabinet 206, such as a magnetic mounting system, for example, will be discussed below, such as with reference to FIG. 2A. As seen in this particular example, camera assembly 212 may be slidably mounted on camera mounting system 222, for example, and camera mounting system 222 may be slidably mounted on cabinet door 210, such as to facilitate and/or support proper vertical and/or horizontal aiming of camera assembly 212 towards VSI 204 of AED 202. For example, at times, vertical and/or horizontal aiming of camera assembly 212 may be achieved via moving camera mounting system 222 laterally, as referenced at 224, and/or camera assembly 212 vertically, such as on camera mounting system 222, as referenced at 226. To facilitate and/or support this, in whole or in part, camera assembly 212 may, for example, be slidably attached to camera mounting system 222 via any suitable attachment means, such as a spring clip, linear guide, rails, or the like. This may, for example, allow camera assembly 212 to be suitably employed for a variety of different makes and/or models of AEDs, different types of VSIs, AED enclosures of varying shapes and/or sizes, or the like. In some instances, it may be useful to position camera assembly 212 and/or camera mounting system 222 in such a way so as not to visually obscure VSI 204 of AED 202, such as if viewed through insert or window 208 while cabinet door 210 is closed, for example.

According to an implementation, camera assembly 212 may comprise, for example, a camera imager or like functionality capable of capturing digital media in any suitable format (e.g., a JPEG TIFF, etc. image), which may be based, at least in part, on a particular timing sequence determined for VSI 204 of AED 202, as will be discussed below. In some instances, a camera imager or like functionality of camera assembly 212 may comprise, for example, a complementary metal-oxide-semiconductor (CMOS) or like technology, just to illustrate one possible implementation. Camera assembly 212 may further comprise lens, such as, for example, wide-angle micro lens capable of addressing a relatively smaller inner space and/or shorter focal-length constraints of AED cabinet 206. At times, camera assembly 212 may further comprise, for example, a lighting system, one or more sensors, appropriate circuitry and/or processing resources (e.g., a processor, memory, etc.), and/or any other suitable component or element capable of facilitating and/or supporting one or more operations and/or techniques for remote electronic monitoring infrastructure. A particular example implementation of a camera assembly that may be used, at least in part, to facilitate and/or support one or more operations and/or techniques for remote electronic monitoring infrastructure will be discussed in greater detail below.

In an implementation, a lighting system may comprise, for example, any suitable light source, such as in a visible, infrared, or any other suitable spectrum. At times, as will also be seen, a lighting system may, for example, be used, at least in part, to illuminate AED 204 and/or VSI 202 in a suitable manner, such as to facilitate and/or support capturing digital media, if appropriate. As will also be seen, a sensor may or may not be part of camera assembly 212 and may comprise, for example, any suitable sensor capable of sensing and/or responding to any applicable input from an operating environment associated with electronic asset monitoring system 200. Input may be represented via one or more appropriate signal sample values, and may include, for example, motion, light, heat, moisture, pressure, and/or any other applicable environmental phenomena. Depending on an implementation, a sensor may comprise, for example, an inertial sensor, ambient environment sensor, etc., or any combination thereof. An inertial sensor may comprise, for example, an accelerometer, gyroscope, magnetometer, etc., just to illustrate a few non-limiting examples. An ambient environment sensor may comprise, for example, a barometric pressure sensor, temperature sensor, ambient light detector, camera sensor, microphone, etc., just to name a few non-limiting examples.

Depending on an implementation, one or more sensors may, for example, sense that cabinet door 210 of AED cabinet 206 is open and/or being opened, such as via acceleration sensed via an accelerometer, light intensity sensed via a light-dependent resistor, noise level sensed via a microphone, or the like, or any combination thereof. At times, one or more sensors may also be capable of providing and/or making available an applicable input signal for further processing and/or communication to any other suitable component of electronic asset monitoring system 200. For example, a signal indicative of a particular input (e.g., acceleration, etc.) may be provided to communications assembly 214 and may be communicated to a suitable server, electronic device, etc., such as via antenna assembly 216 over an applicable electronic network so as to notify one or more appropriate parties regarding a particular condition of AED cabinet 206 (e.g., opened cabinet door 210, etc.). It should be noted that claimed subject matter is not limited to a particular configuration shown and/or described. For example, as was indicated, in some instances, one or ore sensors may be positioned separately from camera assembly 212, such as on cabinet door 210, as one possible example, a plurality of camera assemblies and/or other components may be employed, camera assembly 212 and/or one or more other components may be positioned outside of AED cabinet 206, etc. Also, even though camera assembly 212, communications assembly 214, and antenna assembly 216 are illustrated as separate components, these or like components may be combined in any suitable manner, in whole or in part. For example, in some instances, camera assembly 212 and communications assembly 214 may comprise a single or unitary component, just to illustrate one possible implementation. Likewise, at times, antenna assembly 216 may comprise communications assembly 214 and/or camera assembly 212, if appropriate. Again, claimed subject matter is not so limited.

As was indicated, according to an implementation, communications assembly 214 may comprise, for example, internal components and/or circuitry capable of facilitating and/or supporting one or more operations and/or techniques for remote electronic monitoring infrastructure. For example, as will be discussed in greater detail below, communications assembly 214 may comprise a processor, a memory, a wireless communications device, a battery, a push or like button (e.g., test, reset, etc. button), a status indicator, etc. In some instances, a processor of communications assembly 214 may, for example, be implemented, at least in part, in the form of a microcontroller, and a wireless communications device may be implemented, at least in part, in the form of a Cat-M1 device, as was also discussed. A button on communications assembly 214 may, for example, be used, at least in part, to initiate, test, activate, reset, etc. electronic asset monitoring system 200 and/or any suitable component thereof. For example, a button may be operated, such as pushed, pressed, etc, to initiate and/or test a connection to an applicable wireless and/or wired communications network (e.g., an LTE, etc.), activate communications assembly 214, electronic asset monitoring system 200, or the like.

In an implementation, a status indicator on communications assembly 214 may be implemented, in whole or in part, in the form of any suitable lighting, such as an LED, etc. light that may, for example, visually indicate a status of communications assembly 214 and/or electronic asset monitoring system 200, Such a status may include, for example, a result for testing, activation, communication, etc. of communications assembly 214 and/or electronic asset monitoring system 200. As was indicated, communications assembly 214 may, for example, be capable of communicating with camera assembly 212 and/or antenna assembly 216, such as via communication link 218 and/or 220. As will be seen, these or like communications may be implemented, in whole or in part, to facilitate and/or support capturing, communicating, processing, etc. applicable digital media that may, for example, be based, at least in part, on a particular timing sequence determined for VSI 204 of AED 202. In some instances, communications assembly 214 may, for example, be suitably positioned inside AED cabinet 206, such as in relative proximity to camera assembly 212 and/or antenna assembly 216, such as to facilitate and/or support one or more applicable communications, component powering, or the like. At times, communications assembly 214 may, for example, be attached to AED cabinet 206 or any portion thereof, such as via any suitable attachment means. For example, communications assembly 214 may be attached magnetically to an inner surface or wall of AED cabinet 206, just to illustrate one possible implementation. Claimed subject matter is not so limited, of course. Any other suitable attachment approaches and/or means, fixed or otherwise, may be used herein, in whole or in part. Optionally or alternatively, communications assembly 214 may be simply placed on or inside AED cabinet 206, such as without being attached to AED cabinet 206.

In an implementation, antenna assembly 216 may comprise any suitable communication interface and/or device coupled to a transceiver of electronic asset monitoring system 200, such as, for example, a wireless transmitter and/or wireless receiver capable of transmitting and/or receiving wireless signals according to one or more wireless communication protocols. For example, as was indicated and as will be discussed in greater detail below, in some instances, antenna assembly 216 may operate within an LTE carrier environment, such as utilizing eMTC or like communications, in whole or in part. At times, these or like communications may, for example, be implemented via a Cat-M1 device that may be associated with communications assembly 214. As illustrated in this particular example, in some instances, antenna assembly 216 or a portion thereof may, for example, be positioned externally to AED cabinet 206, in whole or in part. Claimed subject matter is not so limited, of course. For example, at times, antenna assembly 216 or a portion thereof may be positioned internally to AED cabinet 206, in whole or in part. In some instances, antenna assembly 216 may comprise camera assembly 212 and/or communications assembly 214, as was also discussed. In some instances, antenna assembly 216 may, for example, be capable of communicating one or more messages comprising captured digital media to a server or like device via an applicable electronic network (e.g., LTE, etc.), such as for determining an operating condition or status of AED 202, as will also be seen.

Figure 2A:
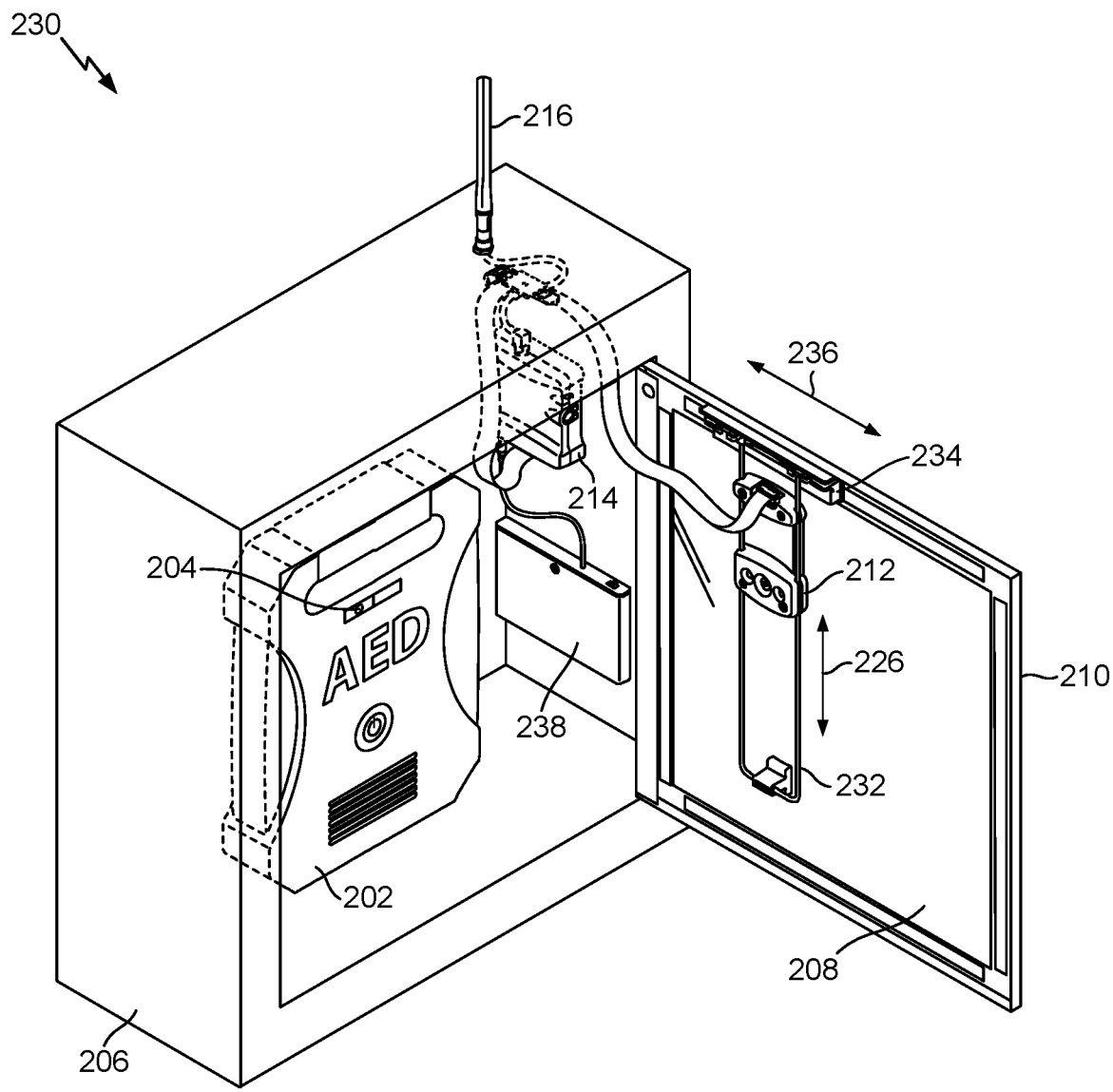
FIG. 2A a schematic diagram illustrating another implementation of an example electronic asset monitoring system.

Referring now to FIG. 2A, which is another implementation of an example electronic asset monitoring system, referenced herein at 230, that may be utilized, in whole or in part, to facilitate and/or support one or more operations and/or techniques for remote electronic monitoring infrastructure, such as implemented via one or more electronic communications, which may include eMTC Cat-M1 device communications, for example. Likewise, in some instances, electronic asset monitoring system 230 may, for example, be associated with operating environment 100 of FIG. 1. Thus, at times, electronic asset monitoring system 230 may comprise and/or be representative of electronic asset monitoring system 102 of FIG. 1, for example, though, again, claimed subject matter is not so limited. In some instances, electronic asset monitoring system 230 may comprise one or more aspects and/or components of electronic asset monitoring system 200, such as discussed above with reference to FIG. 2, for example. As such, one or more features and/or components of electronic asset monitoring system 230 may, for example, correspond to and/or share common features and/or components with electronic asset monitoring system 200 of FIG. 2. Thus, as was previously indicated, for ease of discussion, like numerals of electronic asset monitoring system 230 may, for example, designate like numerals of electronic asset monitoring system 200 of FIG. 2.

Thus, as seen in this particular example implementation, electronic asset monitoring system 230 may comprise, for example, one or more elements or components similar to electronic asset monitoring system 200, such as discussed in detail above with reference to FIG. 2. As also illustrated, in some instances, electronic asset monitoring system 230 may comprise a camera mounting system, referenced herein at 232, that may, for example, be implemented, at least in part, as a magnetic mounting system, as was indicated. For example, at times, camera mounting system 232 may include one or more magnets (not shown) that may be installed on and/or within any suitable portion of camera mounting system 232, such as to facilitate and/or support suitable attachment of camera assembly 212 to AED cabinet 206 via magnetic attraction. As a way of illustration, in some instances, one or more magnets may, for example, be installed on an outer surface of and/or embedded within a guide 234 fixedly attached to camera assembly 232. In at least one implementation, one or more magnets may, for example, face and/or be slidably attached to an inner surface of a frame of cabinet door 210, or a portion thereof, such as if camera mounting system 232 is installed in the intended manner. Thus, at times, cabinet door 210, or a portion thereof, may, for example, be made of a ferromagnetic or any other suitable magnetically attractive material. It should be noted that, in some instances, it may be useful to utilize one or more magnets and/or magnetically attractive material having proprieties that may preclude or reduce effects of electromagnetic shielding or the like, such as to preclude or reduce interference with one or more applicable wireless communications, such as discussed herein.

Likewise, in this example implementation, camera mounting system 232 and/or camera assembly 212 may, for example, be mounted so as to facilitate and/or support proper aiming (e.g., vertical and/or horizontal) of camera assembly 212 towards VSI 204 of AED 202. For example, at times, similarly to camera mounting system 222 of FIG. 2, vertical and/or horizontal aiming of camera assembly 212 may be achieved, at least in part, via moving camera mounting system 232 laterally (e.g., via sliding guide 232, etc.), as referenced at 236, and/or camera assembly 212 vertically, as referenced at 226. Similarly, camera mounting system 232 may, for example, allow camera assembly 212 to be suitably employed for a variety of different makes and/or models of AEDs, different types of VSIs, AED enclosures of varying shapes and/or sizes, or the like. Likewise, in some instances, it may be useful to position camera assembly 212 and/or camera mounting system 232 in such a way so as not to visually obscure VSI 204 of AED 202, such as if viewed through insert or window 208 while cabinet door 210 is closed, for example. As was also indicated above, at times, a battery of electronic asset monitoring system 230 may comprise, for example, a separate or standalone unit, referenced herein at 238, though, again, claimed subject matter is not so limited.

Figure 3:
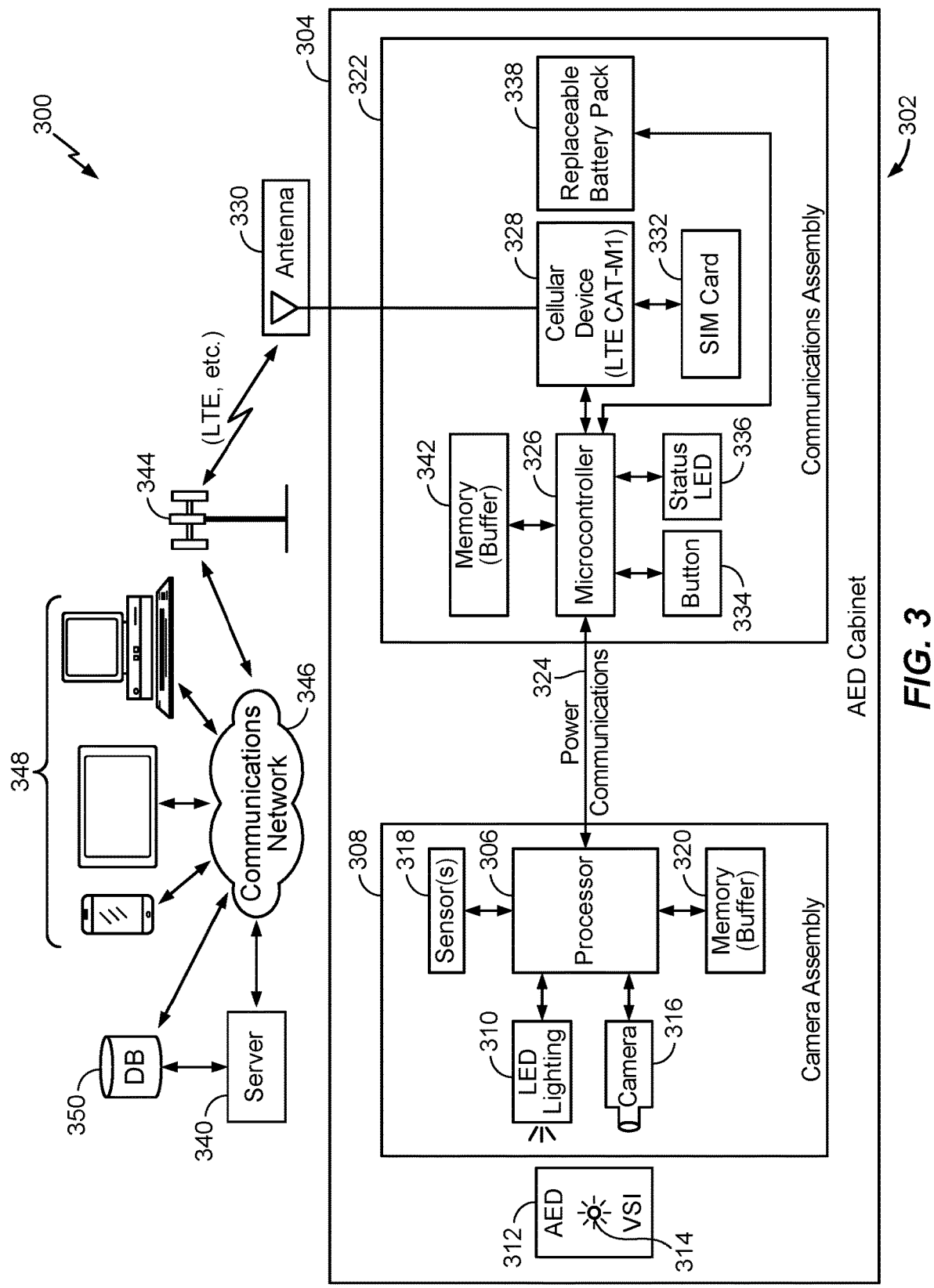
FIG. 3 is a schematic flow diagram of an implementation of an example use case or scenario for remote electronic monitoring infrastructure.

With this in mind, attention is now drawn to FIG. 3, which is a schematic flow diagram of an implementation of an example use case or scenario 300 for remote electronic monitoring infrastructure, such as illustrated in connection with an example electronic asset monitoring system, referenced herein generally at 302. As was indicated and as discussed below, in some instances, use case or scenario 300 may, for example, be implemented, at least in part, via one or more enhanced machine-type communications (eMTC), such as utilizing an eMTC category M1 (Cat-M1) device. It should be noted that information acquired or produced, such as, for example, input signals, output signals, operations, results, etc. associated with example use case or scenario 300 may be represented via one or ore digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features. For example, in some instances, electronic asset monitoring system 302 may be associated with operating environment 100 of FIG. 1 and/or operating environment of FIG. 2. Thus, at times, electronic asset monitoring system 302 may comprise and/or be representative of electronic asset monitoring system 102 of FIG. 1, electronic asset monitoring system 200 of FIG. 2, and/or electronic asset monitoring system 230 of FIG. 2A, for example, though, again, claimed subject matter is not so limited.

Thus, in some instances, such as depending, at least in part, on ambient conditions inside an AED cabinet 304, for example, a processor 306 of a camera assembly 308 comprising electronic asset monitoring system 302 may instruct an associated lighting feature, illustrated herein via an LED Light at 310, to turn on a light to illuminate an AED 312 and/or an AED's VSI 314, such as to facilitate and/or support capturing digital media. It should be noted that even though a particular type of light (e.g., an LED) is illustrated herein, any suitable light capable of illuminating AED 312 and/or VSI 314, such as to facilitate and/or support capturing digital media, for example, may be used, in whole or in part. As used herein, "digital media" refers to a collection of digital signals, such as communicated and/or stored signals (e.g., physical memory states, etc.), for example, representing any content including, as examples, source code, text, image, audio, video file, or the like. In some instances, digital media may comprise, for example, an image or a plurality of images, just to illustrate a few possible implementations.

In this context, "image" refers to any suitable representation of visual content, such as represented via any suitable content or data structure. For example, at times, an image may comprise a dot matrix or like data structure, such as a grid of physical points representative of picture elements or so-called "pixels," A pixel may typically comprise an individually addressable element of an image, such as capable of being processed via one or more image processing or like approaches. In some instances, a pixel may, for example, represent brightness and/or intensity of a given color (e.g., red, green, etc.) at a specific point within an image, such as via a particular pixel value, digital (e.g., 8, 16, 32, etc. bit integer, etc.) or otherwise. Depending on an implementation, an image may be of vector and/or raster type, in a viewable (e.g. JPEG, TIFF, etc.) and/or raw image (e.g., CR2, ORF, NEF, etc.) format, etc., or any combination thereof. It may be understood that "image" is intended to encompass "digital image," such as having a numeric (e.g., binary, etc.) representation, for example, although in the particular context the term "image" may be employed for ease of discussion. It should be noted that claimed subject matter is not limited to particular digital media, such as a still image. For example, in some instances, digital media may comprise a video image, such as in the form of discontinuous (e.g., digital, etc.) and/or continuous (e.g., analog, etc.) signals captured as a set or series of still images.

As alluded to previously, at times, digital media may, for example, be captured, at least in part, via a camera imager or like functionality of electronic asset monitoring system 302. Thus, in some instances, camera assembly 308 of electronic asset monitoring system 302 may include, for example, a camera, referenced herein at 316, that may comprise a CMOS or like imager, just to illustrate one possible implementation. As such, in some instances, camera 316 may comprise, for example, a digital camera. As was also indicated, at times, camera 316 may be capable of addressing a relatively smaller inner space and/or shorter focal-length constraints of AED cabinet 304, such as via wide-angle micro lens, for example.

Continuing with the above discussion, AED 312 and/or VSI 314 may be illuminated, such as via LED light 310, for example, if it is determined that ambient conditions inside AED cabinet 304 are less than sufficient or suitable for capturing digital media. For example, as illustrated via an applicable communication link, processor 306 may communicate with one or more sensors, referenced herein generally at 318, and may determine that ambient conditions inside AED cabinet 304 comprise low light or dark conditions, By way of example, in some instances, such a determination may, for example, be made, at least in part, in connection with an ambient light sensor, just to illustrate one possible implementation. Processor 306 may then instruct LED light 310 to illuminate AED 312 and/or VSI 314 to properly capture digital media. In some instances, AED312X and/or VSI 314 may be illuminated periodically, such as according to one or more predetermined time intervals, for example, or randomly, or any combination thereof, which may depend, at least in part, on a particular asset, status indicator, environment, application, implementation, etc.

Optionally or alternatively, digital media may, for example, be captured without illuminating AED 312 and/or VSI 314, such as if it is determined that ambient conditions inside AED cabinet 304 are sufficient or otherwise suitable for capturing digital media. Likewise, such a determination may, for example, be made, at least in part, via processor 306 in communication with one or more sensors 318. In some instances, such as if image integration or like image processing approach is employed, for example, it may not be required or otherwise useful to illuminate AED 312 and/or VSI 314, such as to capture digital media. As discussed above, in some implementations, one or more sensors 318 may comprise, for example, one or more inertial sensors, such as an accelerometer, as one possible example, which may be used, at least in part, to sense or detect a door opening motion of AED Cabinet 304.

As alluded to previously, since different AEDs may have different VSI types, such as blinking, flashing, illuminating, etc. LED, LCD, etc. lights of various duration, colors (e.g., red, green, etc.), etc., at times, it may be useful to account for these or like differences, such as to facilitate and/or support capturing digital media, for example. As was also indicated, at times, these or like differences may, for example, be accounted for, at least in part, via a particular timing sequence that may be determined for one or more VSIs of a particular monitored asset, such as VSI 314 of AED 312, for this example. As used herein, "particular timing sequence" or simply "timing sequence" refers to a measured image capture event customized or tailored to a particular visual cycle of a VSI. In this context, "image capture event" refers to a distinct occurrence of a recording cycle by an image capturing and/or recording functionality of an electronic device. An image capture event may, for example, be measured temporally, quantitatively, spatially, or the like, or any combination thereof. Thus, as a way of illustration, a timing sequence may define or specify, for example, a number of particular image capture events, timing of a particular image capture event, how many images of VSI are to be captured during a particular image capture event, delay between each individual image capture event, etc., or any combination thereof.

According to an implementation, a visual cycle of a VSI may comprise, for example, a distinct VSI state change or a recurring series of successive VSI state changes, such as manifested via flashing, blinking, turning on and/or off, etc. one or more VSIs. Thus, in some instances, a recording cycle may correspond to or correlate with a VSI visual cycle, though, again, claimed subject matter is not so limited. A recording cycle may, for example, be implemented at a particular point in time, such as to capture a still image of a VSI state change, such as via a flash, blink, etc., and/or a lack thereof, of VSI 314. In some instances, a recording cycle may be implemented during a particular time interval, such as to capture a video image of a VSI state change, or a lack thereof, just to illustrate another possible implementation. It should be noted that any suitable combination of recording cycles may be implemented herein, in whole or in part, which may or may not correspond to or correlate with one or more VSI visual cycles of an asset, such as AED 312, for example.

A particular timing sequence for a VSI may be determined, at least in part, experimentally and may be pre-defined and/or configured, for example, or otherwise dynamically defined in a suitable manner, which may depend on an asset, status indicator, network, operating and/or ambient environment, application, or the like. By way of example but not limitation, in some instances, a timing sequence for a particular asset, such as AED 312, for example, may be determined, at least in part, via measuring a flash time interval between two successive LED state changes of VSI 314, such as in connection with a time interval counter. Here, a synchronous counter may, for example, be utilized, in whole or in part. Claimed subject matter is not limited to a particular timer and/or approach, of course. For example, in some instances, measuring a VSI flash duration in connection with a PIN photodiode may also be used, in whole or in part. If a particular timing sequence appears to be less than sufficient or suitable to capture digital media at an appropriate time (e.g., to capture a VSI flash, etc.), for example, such a timing sequence may be adjusted in a suitable manner, which may be based, at least in part, on based, at least in part, on one or more image capture events. For example, in some instances, a timing sequence may be adjusted via determining a time interval between image capture events previously determined for VSI 314 and/or AES 312, as one possible example, and varying such a time interval appropriately (e.g., increasing, decreasing, etc.). Likewise, here, such an adjustment may be determined, at least in part, experimentally and may be pre-defined or configured, for example, or otherwise dynamically defined in a suitable manner, which may depend, at least in part, on a particular monitored asset, status indicator, network and/or environment, application, or the like. For example, one or more approaches for determining a timing sequence discussed above may also be used herein, in whole or in part.

Thus, in an implementation, a particular timing sequence may, for example, be determined for a particular make, model, etc. of an asset employing a particular VSI type. In some instances, a particular timing sequence may, for example, be determined for a plurality of different types of electronic assets, such as different makes, models, etc. of assets employing different VSI types. For example, at times, a common denominator accounting for a number of varying timing sequences applicable to a plurality of assets and/or respective VSIs may be determined and/or utilized, such as applied uniformly with respect to these assets so as to appropriately capture digital media. Here, any suitable approach, such as utilizing, for example, a median, a mean, a mode, a percentile of mean, a number of instances, a ratio, a rate, a frequency, an entropy, mutual information, probability, etc., or any combination thereof may be used, at least in part, or otherwise considered. At times, this may allow for a particular electronic asset monitoring system to be employed, in whole or in part, for a plurality of assets of different makes, models, etc., with different types of VSIs, for example.

In at least one implementation, a particular timing sequence for one or more VSIs may, for example, be determined and/or defined, at least in part, via one or more intensity threshold values for one or more pixels comprising digital media. For example, in some instances, camera assembly 308 and/or electronic asset monitoring system 302 may include a capability to monitor a pixel stream, such as in a raw pixel image format, as one possible example. It should be noted that, depending on an implementation, a pixel stream may, for example, be monitored in real or near-real time. In this context, "real time" refers to an amount of timeliness of content or data, which may have been delayed by, for example, an amount of time attributable to electronic communication and/or signal processing. Thus, in some instances, camera assembly 308 and/or electronic asset monitoring system 302 may comprise, for example, an image processing or like integrated circuit (IC), which may be in the form of a field-programmable gate array (FPGA), just to illustrate one possible implementation. Here, an FPGA may comprise and/or be associated with processor 306, for example.

Thus, in an implementation, an FPGA and/or processor 306 may, for example, continually monitor a raw pixel stream, such as captured via a camera imager or like functionality of camera 316 comprising electronic asset monitoring system 302, as one possible example, and may process and/or determine intensity of associated pixel values. For example, for a particular captured image or so-called image "frame," an FPGA and/or processor 306 may monitor associated red and/or green pixel values, such as more common for typical VSI indicators, and may compute a running average from these values utilizing one or more appropriate techniques. For example, at times, cumulative pixel values may be utilized, in whole or in part. In some instances, one or more of these running averages, or a combination thereof, may be used, at least in part, as a pixel baseline level for a particular VSI, such as VSI 314 of AED 312, for example. If monitored pixel values change in some manner, such as rise above a VSI pixel baseline level so as to exceed some VSI intensity threshold, for example, an FPGA and/or processor 306 may determine or infer that a VSI state change (e.g., a VSI flash, etc.) has occurred. As such, here, camera 316 may, for example, be instructed, such as by an FPGA and/or processor 306, to implement an image capture event so as to capture an image or a plurality of images of VSI 314 of AEC 312.

Likewise, a VSI pixel baseline level and/or VSI intensity threshold may be determined, at least in part, experimentally and may be pre-defined or configured, for example, or otherwise dynamically defined in a suitable manner depending on a particular monitored asset, status indicator, network and/or environment, application, or the like. For example, at times, a VSI pixel baseline level may be determined, at least in part, via measuring and/or determining a pixel intensity distribution within one or more image frames comprising a depiction of VSI 314 without a flash, which may be representative of a background image. In some instances, a VSI intensity threshold may, for example, be based, at least in part, on a VSI pixel baseline level determined for monitored pixel values. As a way of illustration, a VSI intensity threshold may, for example, be determined via one or more intensity quantification approaches, relational operators defining one or more peaks of pixel intensities (e.g., for red, green, etc. pixel values), one or more pixel intensity histograms, or the like. Claimed subject matter is not limited to a particular approach, of course. At times, one or more monitored pixel values may be accumulated and/or stored, such as in a memory 320, as one possible example, prior to computing a running average. For example, monitored pixel values may be stored for one or more given frames comprising pixel values changed over time and subsequently utilized, such as sets of pixel values. It should be noted that, at times, a running average may be computed without storing pixel values, such as in memory 320, for example. In some instances, memory 320 may comprise, for example, a temporary memory, such as a buffer memory, as one possible example, though, again, claimed subject matter is not so limited.

In an implementation, one or more particular background image values, such as gray pixel values, as one example, may be utilized, in whole or in part, such as for a scaled (e.g., grayscale, etc.) image of VSI 314, for example, in a similar fashion. For example, here, similarly, one or more background images may, for example, be taken while VSI 314 is not flashing, blinking, etc. so as to determine one or more appropriate and/or applicable pixel background values. Subsequently, these or like background values may, for example, be used, at least in part, to detect a particular pixel value that may be different (e.g., brighter, etc.) from one or more background values, such as while monitoring a raw pixel stream. At times, a detected pixel value may, for example, be representative of a different pixel color (e.g., green, rather than gray, etc.) within an image frame, which, again, may be indicative of a VSI state change, such as a flash, etc. Likewise, here, camera 316 may, for example, be instructed to implement an image capture event via a camera imager or like functionality so as to capture an image or a plurality of images of VSI 314 of AED 312.

Continuing with the above discussion, according to an implementation, having determined a particular timing sequence, such as for VSI 314 of AED 312, for example, such a timing sequence may be used, at least in part, to anticipate a VSI state change and/or capture a VSI state change, such as via digital media. As also illustrated, captured digital media may, for example, be communicated to a communications assembly 322, such as via a communication link 324. As was indicated, communication link 324 may comprise, for example, a wired communications link, a wireless communications link, or any combination thereof. In some instances, communication link 324 may also be utilized, at least in part, to power one or more components of camera assembly 322 and/or communication assembly 308, such as via a suitable power transfer approach, as was also discussed. At times, captured digital media may, for example, be stored in a memory 320, such as prior to being communicated. Digital media may be stored for any suitable duration of time, such as to facilitate and/or support pre-processing, processing, buffering, or the like, though claimed subject matter is not so limited. For example, in some instances, digital media may be communicated to communications assembly 3221 in real or near-real time, such as at or upon capturing.

Further, in an implementation, communications assembly 322 may comprise, for example, a processor, illustrated herein via a microcontroller at 326, that may be capable of communicating with one or more components of communications assembly 322 and/or camera assembly 308, such as to facilitate and/or support one or more operations and/or techniques for remote electronic monitoring infrastructure. Thus, microcontroller 326 may comprise any suitable computing device having appropriate circuitry and/or processing resources to facilitate and/or support these or like operations and/or techniques. Microcontroller 326 may, for example, be capable of initiating one or more wireless communications of digital media, such as via communicating with a wireless communications device, referenced herein via a cellular device at 328, and/or an antenna assembly 330. As was indicated, in some instances, cellular device 328 may comprise, for example, an eMTC Cat-M1 device that may be capable of implementing and/or supporting LTE communications and/or like cellular traffic (e.g., Cat-0 and above, etc.), voice LTE (VoLTE), full-to-limited mobility, etc., deliver 15 dB of increased link budget, operate within an LTE carrier environment of up to a 20 MHz operational bandwidth, or the like. In some instances, cellular device 328 may include a subscriber identity module (SIM) or like feature, for example, referenced herein generally via a SIM card at 332, such as for identification and/or subscription purposes, just to name a few. For example, cellular device 328 may access appropriate content or data stored on SIM card 332, such as to verify a subscriber's identity, wireless service eligibility, or the like prior to implementing one or more wireless communications. In some instances, SIM card 332 may, for example, facilitate and/or support encryption of digital media in a suitable manner, just to illustrate another possible implementation. Here, any suitable encryption techniques, such as employing cryptographically secure keys, digital footprints, or the like, may be used, in whole or in part.

As was indicated, in an implementation, communications assembly 322 may further comprise, for example, a push or like button, referenced herein at 334, that may be used, at least in part, to initiate, test, activate, reset, etc. electronic asset monitoring system 302 and/or any suitable component thereof, such as communication assembly 322, as one possible example. Communications assembly 322 may also comprise, for example, a status light, illustrated herein via an LED light at 336, that may visually indicate a status of communications assembly 322 and/or one or more associated components, such as with respect to connectivity, communication, operation, or the like. As illustrated via a number of respective communication links, microcontroller 326 may, for example, receive input from button 334, if activated, such as via one or more applicable signals, and may communicate with cellular device 328 and/or antenna assembly 330 so as to test and/or determine a wireless connectivity status of communication assembly 322, etc. Once determined, microcontroller 326 may, for example, output an appropriate signal to visually indicate such a status, such as via status LED 336. As was also discussed, communications assembly 322 may also comprise, for example, a battery, illustrated in this example as a replaceable battery pack at 338, which may be capable of communicating with microcontroller 326, such as with respect to a charge or power level, as one possible example, via a respective communication link.

Thus, continuing with the above discussion, in an implementation, captured digital media may be communicated from camera assembly 308 to communication assembly 322, such as via one or more applicable communications between processor 306 and microcontroller 326, for example, utilizing communication link 324, at least in part. In turn, microcontroller 326 may communicate with cellular device 328, such as a Cat-M1 device, for example, and may instruct cellular device 328 to initiate one or more communications of one or more messages comprising captured digital media to a server 340, such as via antenna assembly 330. As will be seen, in some instances, captured digital media may be communicated to server 340 for processing, which may include one or more image processing operations and/or techniques, for example, that may be used, at least in part, to determine a status or operating state of AED 312. At times, captured digital media may, for example, be stored or accumulated in some manner, such as prior to being communicated to server 340. For example, captured digital media may be stored in a memory 342, which may comprise a memory buffer, as one possible example, for any suitable duration of time, such as to facilitate and/or support preprocessing, processing, buffering, or the like. Likewise, claimed subject matter is not so limited. For example, in some instances, captured digital media may be communicated to server 340 in real or near-real time, such as upon receipt from camera assembly 308.

As illustrated, according to an implementation, one or more messages comprising captured digital media may, for example, be communicated to server 340 via one or more communications links and/or networks, such as utilizing one or more applicable communication protocols. For example, in some instances, one or more messages may be communicated via a cellular data communications protocol, such as utilizing a cellular communications network, illustrated herein generally via a cellular base transceiver station (BTS) at 344. As indicated above, at times, a message may, for example, be at least partially defined via the eMTC standard, which provides for data rates up to 1 Mbps, while utilizing 1.4 MHz device bandwidth (e.g., 1.08 MHz in-band transmissions of 6 resource blocks, etc.) in existing LTE frequency division duplex (FDD) and/or time division duplex (TDD) spectrum. Thus, in at least one implementation, BTS 344 may comprise, for example, eNode B capable of operating within an LTE or like carrier environment, as was also discussed. As a way of illustration, a message may, for example, be communicated via an LTE positioning protocol (LPP), an LPP extensions (LPPe) protocol, a Secure User Plane Location (SUPL) user plane location protocol (ULP), a Location Services Application Protocol (LCS-AP) control plane protocol, or the like, or any combination thereof. As also illustrated, in an implementation, BTS 344 may, for example, be further operatively and/or communicatively coupled to an electronic network, illustrated herein via a communications network at 346. Communications network 346 may comprise, for example, a number of wired and/or wireless communication links that may be used, at least in part, to facilitate and/or support communication of one or more messages comprising captured digital media to server 340, such as from electronic asset monitoring system 302. As will also be seen, at times, communications network 346 may also be used, at least in part, to facilitate and/or support one or more communications between server 340 and one or more applicable electronic devices, referenced herein generally at 348, that may be co-located or associated with one or more appropriate parties or entities.

Thus, in an implementation, server 340, having received one or more messages comprising captured digital media, may, for example, employ one or more processing operations and/or techniques, which may include image processing, as one possible example, to determine a status or operating condition of AEC 312. For example, in some instances, here, convolutional neural network (CNN), Hidden Markov models (HMM), pixilation, pattern recognition, image integration, or like approaches may be utilized, in whole or in part, to electronically analyze captured digital media and/or determine whether one or more associated images of AED 312 and/or VSI 314 contain a VSI state change, such as a flash, blink, icon, etc. In some instances, one or more processing operations and/or techniques on captured digital media may include comparing a number of consecutive images of VSI 314, such as frame-by-frame, for example, to determine whether these images contain a VSI state change, just to illustrate another possible implementation. It should be noted that, in some implementations, digital media may, for example, be processed in near-real-time and/or with any suitable time delay (e.g., in non-real-time, etc.). It should also be appreciated that any other suitable image processing operations and/or techniques, such as instead of or in addition to one or more operations and/or techniques indicated above may be used herein, in whole or in part.

Thus, having processed captured digital media, a status or operating condition of AED 312 may be determined. For example, if one or more processing operations and/or techniques indicated above (e.g., a VSI image analysis, etc.) reveal that captured digital media comprises a VSI state change, such as a blink, flash, etc. of VSI 314, then it may be determined that AED 312 is ready and/or in a proper working order. In some instances, a determined AED status, captured digital media, and/or any other suitable information or content may, for example, be stored, in whole or in part, such as one or more digital signals and/or states, in a suitable repository, illustrated herein via a database 350. Thus, at times, database 350 may, for example, be capable of communicating with server 340 and/or communications network 346, such as via one or more applicable communications links, as illustrated. It should be noted that, in some instances, a determined status, captured digital media, and/or any other suitable information or content may, for example, be stored on server 340, in whole or n part, such as in a suitable memory or like repository. As also illustrated via a number of corresponding communications links, database 350 may, for example, be accessible by one or more electronic devices 348 that may be co-located and/or associated with one or more appropriate parties or entities. For example, in some instances, database 350 may be accessed via communications network 346, such as by one or more AED owners, operators, customers, distributors, etc. utilizing client devices so as to view a status of AED 312, which may be implemented in connection with a suitable on-line portal, just to illustrate one possible implementation.

In some instances, such as if one or more processing operations and/or techniques indicated above (e.g., a VSI image analysis, etc.) reveal that AED 312 is not ready and/or not in a proper working order, server 340 may, for example, generate one or more signals representative of electronic notifications and may transmit these or like signals to one or more electronic devices 348. As illustrated, at times, one or more electronic notifications may, for example, be transmitted via communications network 346, such as via one or more applicable communication links, just to illustrate one possible implementation. It should be noted that, in some instances, server 340 may, for example, be capable of communicating with one or more electronic devices 348 directly. As was indicated, a determination that AED 312 is not ready and/or not in a proper working order may, for example, be made, at least in part, if one or more processing operations and/or techniques, such as discussed above, reveal that captured digital media contains no VSI state change during a particular timing sequence determined for AED 312.

In an implementation, one or more electronic notifications may comprise, for example, an action alert, such as transmitted via an e-mail, short message service (SMS), text message, etc. to one or more appropriate parties or entities, such as users, subscribers, distributors, etc. co-located and/or or associated with one or more electronic devices 348 and alerting such parties or entities that there may be an issue with AED 312. For example, one or more electronic notifications may alert one or more parties or entities that AED 312 may have issues with internal circuitry, that its battery level is low, or the like. In turn, based, at least in part, on these or like of electronic notifications, one or more appropriate operations and/or processes may, for example, be implemented and/or performed, such as to facilitate and/or support readiness and/or proper operation of AED 312. For example, here, maintenance on AED 312 may be conducted in a timely manner, such as by one or more notified parties or entities, and/or any other suitable party and/or service, in accordance with manufacturer recommendations, applicable processes, regulations, or the like.

In some instances, server 340 may receive a signal from electronic asset monitoring system 302 indicating that a door of AED cabinet 304 is open, which may be detected via one or more sensors 318, for example, as discussed above, and may generate and/or transmit one or more appropriate electronic notifications to one or more electronic devices 348, such as in a similar manner. Here, security personnel, first responders, or like parties or entities, which may or may not be associated with one or more electronic devices 348, may, for example, be alerted and/or dispatched to a location of AED 312, such as to address an issue in a timely manner. For example, at times, an open door of AED cabinet 304 may indicate that AED 312 is being put in use (e.g., to treat a SCA, etc.). In some instances, an open door status of AED cabinet 304 may be corroborated via one or more additional sensor measurements (e.g., a microphone, ambient light sensor, etc.), video feed from camera 316, audio feed from a microphone comprising one or more sensors 318, or the like. Here, a first responder may, for example, be notified in a suitable manner and/or provided with a location of AED 312, and may be guided, such as via a turn-by-turn navigation instructions displayed via a user interface of a co-located mobile device, as one possible example, to a location of AED 312. At times, such notifications and/or instructions may, for example, be implemented utilizing a location-based or like functionality of cellular device 328, such as a Cat-M1 device, just to illustrate one possible implementation. For example, here, a Cat-M1 device may be capable of performing measurements of PRS in connection with OTDOA or like positioning, as was indicated. To illustrate, a Cat-M1 device may, for example, be capable of integrating a cellular signal received from BTS 344, such as utilizing an applicable transmitter carrier frequency, and may determine and/or provide its location to one or more electronic devices 348, such as via communications network 346.

In an implementation, server 340 may be capable of determining whether one or more accessories of AED 312 are approaching an expiration date, which may also be based, at least in part, on processing digital media, such as in a similar fashion. For example, captured digital media may be processed, such as by server 340, as one possible example, to determine whether these images comprise one or more error messages or like indications, such as via a particularly illuminated (or not illuminated) VSI 314, icon, symbol, legend, etc. on an associated display panel of AED 312. Optionally or alternatively, status of one or more accessories of AED 312 may, for example, be determined, at least in part, via monitoring and/or computing one or more applicable expiration dates. In some instances, these or like dates may, for example, be inputted or entered (e.g., manually, uploaded, etc.) upon registration of AED 312, service subscription, etc. and/or may be stored in database 350 and/or suitable memory of server 340, such as with reference to AED 312. For example, AED 312 may be registered with information or content including an AED's make, model, distributor, customer, location, battery expiration date, electrodes, pads, etc. expiration date, contact information, or the like. Thus, server 340 may, for example, access such information or content and may check battery, electrode, pads, etc. expiration dates, or any other suitable dates, for AED 312. Server 340 may, for example, check such information or content on a daily, semi-weekly, weekly, etc. basis.

Thus, in some instances, such as if server 340 calculates or otherwise determines that an AED accessory expiration date is approaching, which may be based, at least in part, on AED registration, as one possible example, server 340 may generate and/or transmit an action alert in a similar manner. For example, server 340 may generate and/or transmit one or more signals representative of electronic notifications (e.g., an e-mail, SMS, etc.) to one or more electronic devices 348 associated with one or more applicable parties or entities (e.g., a subscriber, distributor, etc.), such as via communications network 346, thus, alerting such parties or entities that one or more replacement accessories are needed. At times, one or more electronic notifications may include, for example, an approaching accessory expiration date and/or any other suitable information or content, such as where to purchase an accessory, etc. In some instances, electronic asset monitoring system 302 may, for example, be capable of monitoring its own resources (e.g., battery 338, etc.), such as on a daily, weekly, etc. basis and may communicate (e.g., upload, etc.) this or like information or content to server 340, database 350, etc. in a suitable manner (e.g., periodically, upon checking, continually, etc.).

It should be noted that claimed subject matter is not limited to a particular implementation shown and/or discussed, such as in connection with one or more figures of the present disclosure. As was indicated, in some instances, one or more other components and/or aspects may be employed herein, in whole or in part, such as instead of and/or in addition to one or more components and/or aspects illustrated and/or discussed herein without deviating from the scope of claimed subject matter. For example, at times, electronic asset monitoring system 302 may be capable of communicating digital media to server 340 via a wired communication link, which may include a wired serial port, just to illustrate another possible implementation, or any combination of wired and wireless communication links. In some instances, AED 312 and/or electronic asset monitoring system 302 may be capable of utilizing global (GPS, etc.) and/or local (e.g., building Wi-F A-GPS, etc.) communication links, such as for the purposes of estimating a position fix, guiding appropriate parties to a location of AED 312, communicating digital media, or the like. As another example, AED 312 and/or electronic asset monitoring system 302 may, for example, be capable of communicating with server 340 directly, such as via an appropriate wired and/or wireless (e.g., a Wi-Fi access point, femtocell, cable, etc.) functionality.

Also, in some instances, one or more operations and/or techniques discussed herein, such as for processing captured digital media to determine a status or operating condition of AED 312, for example, may be implemented, at least in part, via electronic asset monitoring system 302, such as in a similar manner. For example, processor 318, microcontroller 326, and/or any other suitable component (e.g., an FPGA, etc.) of electronic asset monitoring system 302 may employ, in whole or in part, one or more image processing approaches, which may include one or more of approaches discussed above, and may determine a status or operating condition of AED 312, such as, again, in a similar manner.

Having determined a status or operating condition of AED 312, electronic asset monitoring system 302 may, for example, communicate such a status or operating condition to one or more electronic devices 348, server 340, database 350, etc., or any combination thereof, such as via communications network 346 and/or directly. For example, electronic asset monitoring system 302 may generate and/or transmit an action alert to one or more appropriate parties or entities, such as via one or more electronic notifications, likewise, in a similar manner.

Also, at times, instead of battery 338, a plug-in power supply device may be used herein, at least in part, and/or one or more suitable energy harvesting methods, such as a solar cell, array, or the like. Electronic asset monitoring system 302 may also comprise, for example, an emergency alert button, which may generate and/or transmit an appropriate emergency message to a suitable party or entity (e.g., a facility operator, first responder, security personnel, etc.), such as upon activation. In some instances, camera 316 may, for example, be used, at least in part, for movement detection, such as for security and/or one or more other applications. For example, as discussed above, camera 316 may be used, at least in part, to determine whether AEC 312 is being deployed, such as via a video feed or any other suitable functionality. Further, in some instances, such as instead of or in addition to a cellular communications network, a local wireless network (e.g., Wi-Fi, Zigbee, etc.) may, for example, be employed herein, in whole or in part.

At times, instead of wireless communication, such as discussed herein wired communication may be used, at least in part, such as an Ethernet or a telephone line, for example, to implement one or more operations and/or techniques for remote electronic monitoring infrastructure. Also, in some instances, instead of longer-range communications, a shorter-range (e.g., Bluetooth, etc.) communications may, for example, be implemented herein, as appropriate. For example, electronic asset monitoring system 302 may establish a shorter-range connection with one or more proximate communication devices (e.g., access points, femtocells, mobile devices of co-located users, passing facilities personnel, etc.), which may forward one or more messages (e.g., digital media, etc.) or other communications to server 340, such as via one or more applicable communications networks and/or protocols.

Figure 4:
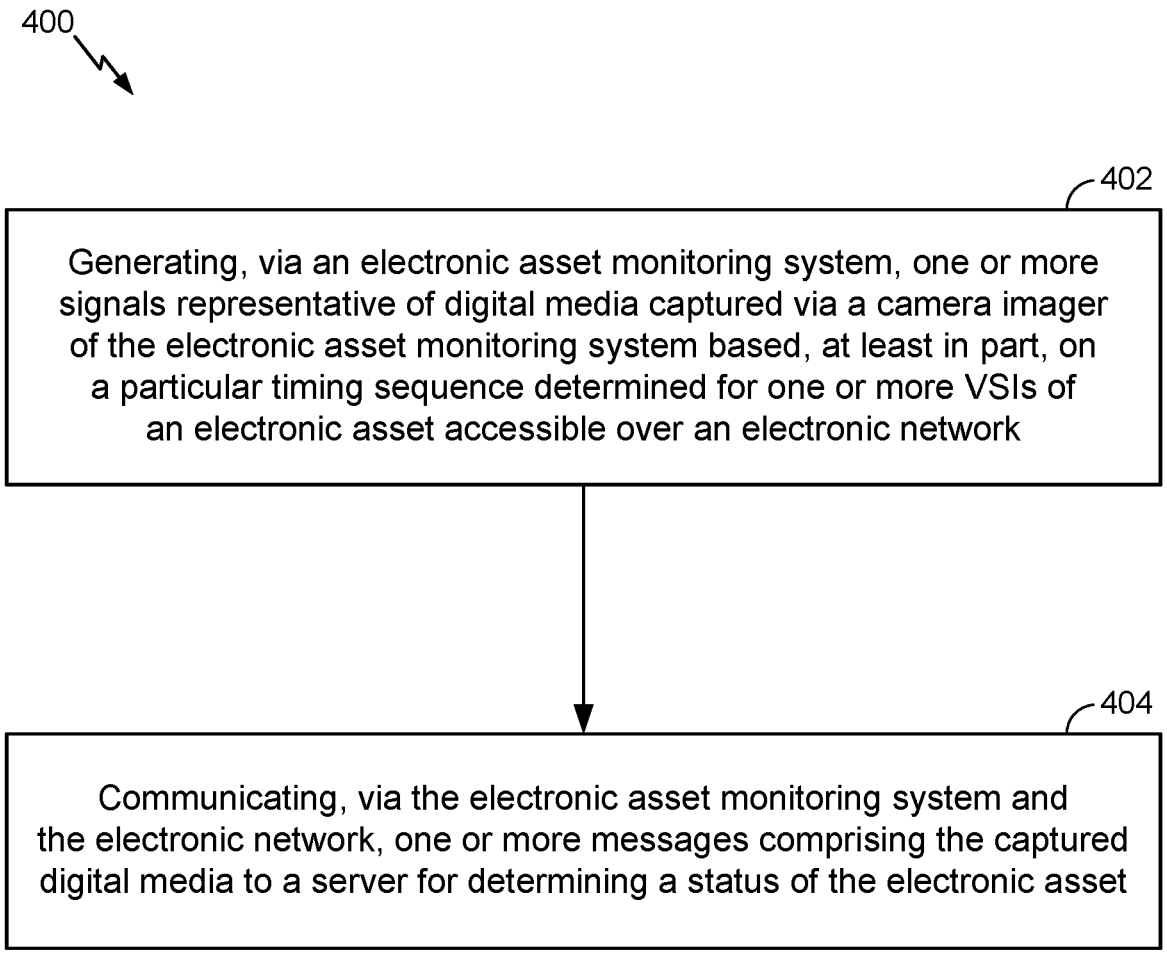
FIG. 4 is a flow diagram illustrating an implementation of an example process for remote electronic monitoring infrastructure.

FIG. 4 is a flow diagram illustrating an implementation of an example process 400 that may be performed, in whole or in part, to facilitate and/or support one or more operations and/or techniques for remote electronic monitoring infrastructure, such as implemented via one or more electronic communications, at least in part. As was indicated, at times, process 400 may be implemented, at least in part, via an electronic asset monitoring system, such as electronic asset monitoring system 200 of FIG. 2, electronic asset monitoring system 230 of FIG. 2A, and/or electronic asset monitoring system 302 of FIG. 3, which may comprise, for example, an eMTC Cat-M1 device. Thus, in some instances, one or more operations and/or techniques of process 400 may be implemented, at least in part, via an LTE or like network, such as utilizing, for example, eNode B or like wireless transceivers capable of operating within an LTE or like carrier environment, just to illustrate one possible implementation. At times, one or more operations and/or techniques of process 400 may, for example, be implemented, at least in part, via a server device, such as one or more servers 116, 118, and/or 120 of FIG. 1 and/or server 340 of FIG. 3, or any combination of a server device and an electronic asset monitoring system. In some instances, one or more operations and/or techniques of process 400 may, for example, be implemented, at least in part, via an electronic asset monitoring system. It should be noted that information acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As was also discussed, process 400 may, for example, be implemented, in whole or in part, in connection with any suitable communication and/or positioning protocol. For example, at times, process 400 may be implemented, at least in part, in connection with a Cat-M1 device capable of facilitating and/or supporting OTDOA or like positioning using a Long Term Evolution (LTE) positioning protocol (LPP), though, again, claimed subject matter is not limited in this regard. In some instances, an LPPe, LPP/LPPe, RRC protocol (e.g., as defined in 3GPP TS 36.331, etc.), IS-801 protocol (e.g., as defined in 3GPP2 TS C.S0022, etc.), or the like may also be employed herein, in whole or in part. Thus, in some instances, one or more operations and/or techniques for process 400 may, for example, be implemented in connection with OTDOA positioning for UMTS access, Enhanced Observed Time Difference (E-OTD) for GSM or AFLT, or the like. In addition, a downlink signal, such as measured by an antenna assembly of electronic asset monitoring system may not be a PRS, such as currently defined in 3GPP, but some other downlink reference signal or pilot signal (e.g., a common reference signal (CRS) for LTE, etc.). In addition, measurements of a downlink signal may not be of RSTD, such as also defined by 3GPP, for example, but instead of some other suitable quantity and/or phenomena, such as TOA, angle of arrival (AOA), received signal strength (e.g., RSSI), return trip time (RTT), signal-to-noise (S/N) ratio (SNR), or the like. Thus, although one or more applicable techniques, protocols, measured quantities, processing approaches, etc. may differ, an approach for remote electronic monitoring infrastructure, such as implemented via one or more electronic communications and/or one or more computing and/or communications networks and/or protocols (e.g., network protocols) discussed herein, for example, may be the same as or similar to that described for process 400.

Thus, example process 400 may, for example, begin at operation 402 with generating, via an electronic asset monitoring system, one or more signals representative of digital media captured via a camera imager of the electronic asset monitoring system based, at least in part, on a particular timing sequence determined for one or more visual status indicators (VSIs) of an electronic asset accessible over an electronic network. For example, as was indicated, in some instances, one or more signals representative of digital media may be generated, at least in part, via a processor or like functionality of an electronic asset monitoring system, such as in connection with an associated camera utilizing a CMOS-type imager, just to illustrate one possible implementation. Digital media may comprise, for example, one or more images of VSI state change, such as manifested via a flash, blink, error icon, etc., and/or a lack thereof. As also indicated above, a particular timing sequence may, for example, account for one or more differences in electronic assets, VSIs, or the like and may be used, in whole or in part, to facilitate and/or support capturing digital media. Depending on an implementation, a particular timing sequence may, for example, be defined, at least in part, via a number of particular image capture events, timing of a particular image capture event, how many images of VSI are to be captured during a particular image capture event, delay between each individual image capture event, etc., or any combination thereof, as was also discussed. An electronic network may comprise, for example, a wired and/or wireless communications network capable of facilitating and/or supporting communication of one or more messages comprising captured digital media to a suitable server, one or more communications between a server and one or more applicable electronic devices, or the like, such as discussed herein.

With regard to operation 404, one or more messages comprising the captured digital media may, for example, be communicated to a server, such as via the electronic asset monitoring system and the electronic network, for determining a status of the electronic asset. For example, as was also discussed, a suitable component of an electronic asset monitoring system may comprise a cellular device, such as a Cat-M1 device, as one possible example, that may be instructed, such as via a processor or like functionality of the electronic asset monitoring system, to initiate one or more wireless communications to a server via an associated antenna assembly. Depending on an implementation, communication of messages may, for example, be implemented, at least in part, according to an LTE positioning protocol (LPP), an LPP extensions (LPPe) protocol, a Secure User Plane Location (SUPL) user plane location protocol (ULP), a Location Services Application Protocol (LCS-AP) control plane protocol, or the like, or any combination thereof. As was also indicated, a suitable server, having received one or more messages comprising captured digital media, may, for example, employ one or more processing operations and/or techniques (e.g., CNN, HMM, etc.) so as to determine a status of a particular electronic asset (e.g., ready, not ready, accessories approaching expiration date, etc.). Based, at least in part, on a determined status, one or more electronic notifications may, for example, be generated, such as by a server, as one possible example, and transmitted to one or more applicable electronic devices so as to alert one or more associated parties or entities that a particular electronic asset may require attention (e.g., maintenance, part or accessory replacement, etc.), as was also discussed.

Figure 5:
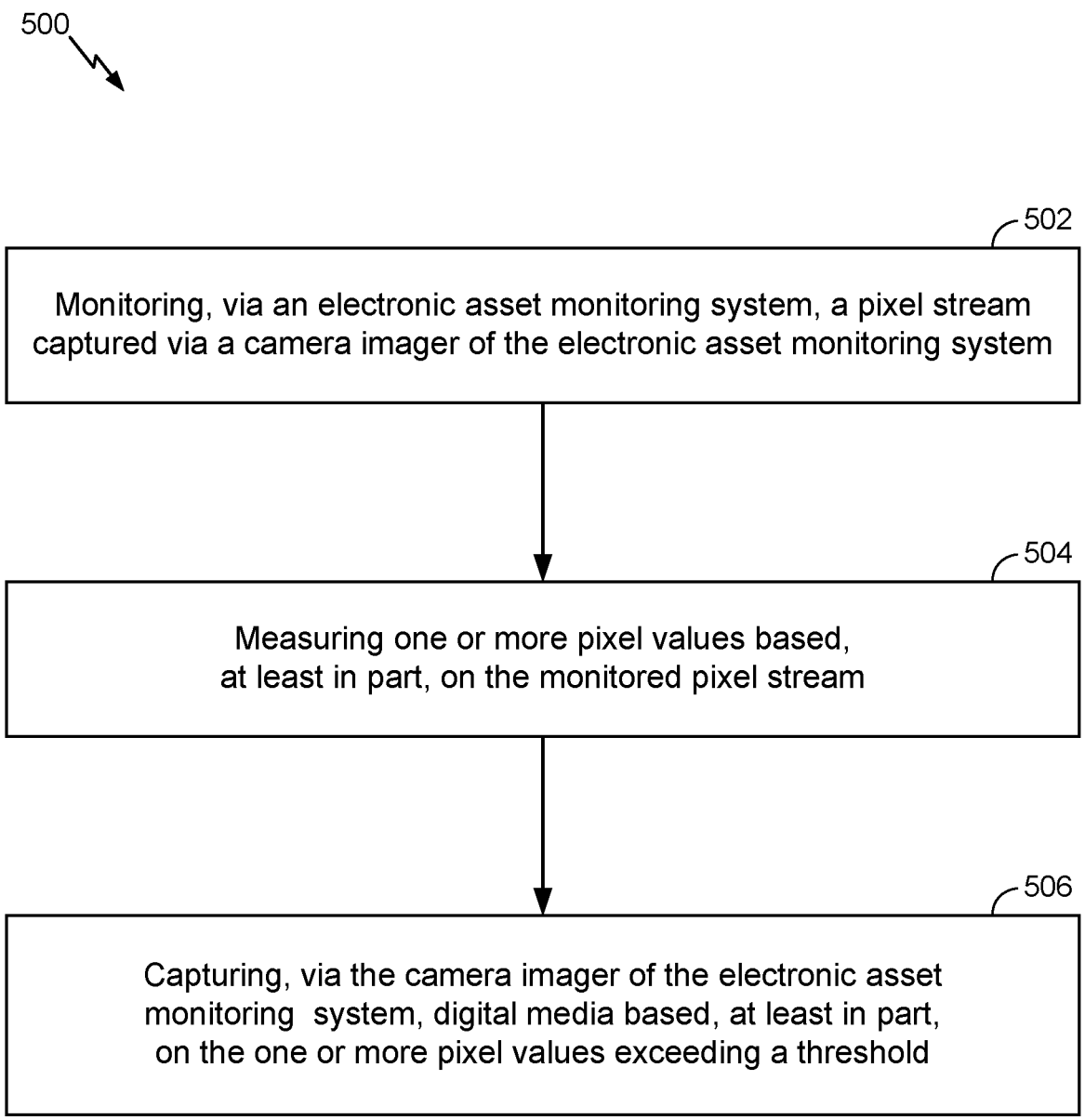
FIG. 5 is a flow diagram illustrating another implementation of an example process for remote electronic monitoring infrastructure.

Attention is now drawn to FIG. 5, which is a flow diagram illustrating an implementation of another example process, referenced herein at 500, that may be performed, in whole or in part, to facilitate and/or support one or more operations and/or techniques for remote electronic monitoring infrastructure. Likewise, at times, process 500 may be implemented, at least in part, via an electronic asset monitoring system, such as electronic asset monitoring system 200 of FIG. 2, electronic asset monitoring system 230 of FIG. 2A, and/or electronic asset monitoring system 302 of FIG. 3, which may comprise, for example, an eMTC Cat-M1 device. Further, similarly to process 400 of FIG. 4, one or more operations and/or techniques of process 500 may, for example, be implemented, at least in part, via a server device, an electronic asset monitoring system, or any combination thereof, such as utilizing an LTE or like network, in whole or in part. In addition, it should be noted that information acquired or produced, such as, for example, input signals, output signals, operations, results, etc. associated with example process 500 may also be represented via one or more digital signals. It should also be appreciated that even though one or more operations are illustrated or described concurrently or with respect to a certain sequence, other sequences or concurrent operations may be employed. Also, even though the description below references particular aspects and/or features illustrated in certain other figures, one or more operations may be performed with other aspects and/or features.

Thus, example process 500 may, for example, begin at operation 502 with monitoring, via an electronic asset monitoring system, a pixel stream captured via a camera imager of the electronic asset monitoring system. In some instances, a monitored pixel stream may comprise, for example, a pixel stream in a raw pixel image format, just to illustrate one possible implementation. With regard to operation 504, one or more pixel values may, for example, be measured based, at least in part, on the monitored pixel stream. For example, one or more pixel values may be processed, such as via an FPGA or like functionality of an electronic asset monitoring system, as was indicated. In some instances, an FPGA or like functionality of an electronic asset monitoring system may, for example, measure and/or determine a pixel intensity distribution within one or more image frames comprising a monitored pixel stream. Here, a running average from applicable pixel values (e.g., accumulated, cumulative, etc. red, green, etc. pixel values) may, for example, be computed and utilized, in whole or in part, as was also indicated. More specifically, if monitored pixel values change in some manner, such as rise to exceed a threshold, for example, digital media (e.g., one or more images of a VSI, etc.) may be captured, such as via the camera imager of the electronic asset monitoring system, as indicated at operation 506. In some instances, a threshold may comprise, for example, an intensity threshold for a particular VSI of an electronic asset, and may be based, at least in part, on and/or defined in connection with a pixel baseline level determined for a monitored pixel stream, as was also indicated. Likewise, here, captured digital media may be analyzed and/or communicated to a suitable server, and a status of an electronic asset may, for example, be determined, such as via one or more appropriate processing techniques. Based, at least in part, on a determined status, one or more electronic notifications (e.g., action alerts, etc.) may, for example, be generated and transmitted to one or more appropriate electronic devices (e.g., subscribers, asset owners, etc.), such as to facilitate and/or support readiness and/or proper operation of an electronic asset, as was also discussed.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under," While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product, Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (RDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet, Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "WEB" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter is not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory) Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example, claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 6:
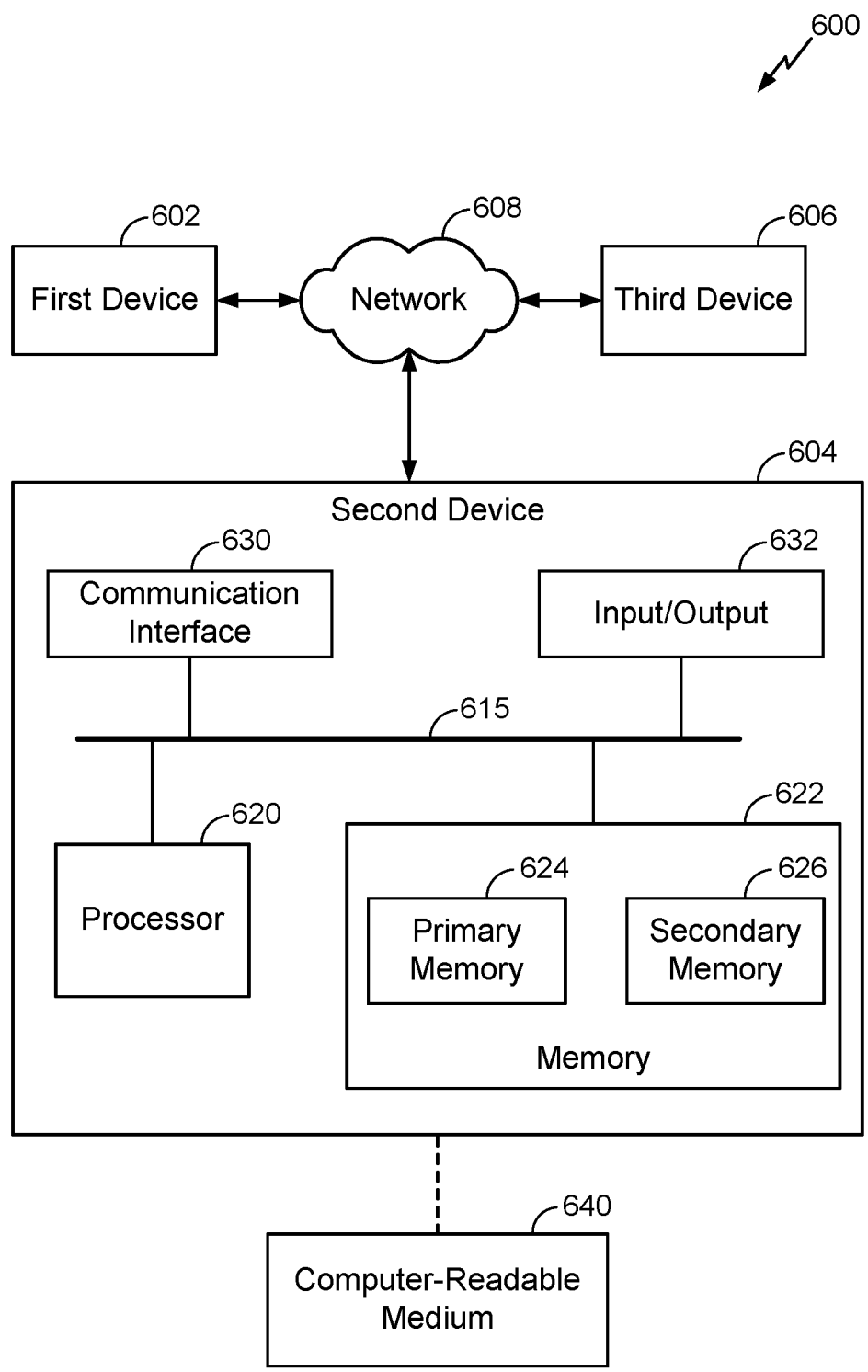
FIG. 6 is a schematic diagram illustrating an implementation of a computing device that may be employed in a client-server type interaction.

In one example embodiment, as shown in FIG. 6, a system embodiment may comprise a local network (e.g., a second device 604 and a computer-readable medium 640) and/or another type of network, such as a computing and/or communications network. For purposes of illustration, therefore, FIG. 6 shows an embodiment 600 of a system that may be employed to implement either type or both types of networks. Network 608 may comprise one or more network connections, links, processes, services, applications, and/or resources to facilitate and/or support communications, such as an exchange of communication signals, for example, between a computing device, such as 602, and another computing device, such as 606, which may, for example, comprise one or more client computing devices and/or one or more server computing device. By way of example, but not limitation, network 608 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 6 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USG 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-3 of the present disclosure.

Referring now to FIG. 6, in an embodiment, first and third devices 602 and 606 may be capable of rendering a graphical user interface (GUI) for a network device and/or a computing device, for example, so that a user-operator may engage in system use. Device 604 may potentially serve a similar function in this illustration. Likewise, in FIG. 6, computing device 602 ('first device' in figure) may interface with computing device 604 ('second device' in figure), which may, for example, also comprise features of a client computing device and/or a server computing device, in an embodiment. Thus, computing device 604 may comprise, for example, a communication interface 630, which may facilitate and/or or support one or more communications, such as wired and/or wireless communications, between one or more devices, such as discussed herein. Processor (e.g., processing device) 620 and memory 622, which may comprise primary memory 624 and secondary memory 626, may communicate by way of a communication bus 615, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 604, as depicted in FIG. 6, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MIMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 6, computing device 602 may provide one or more sources of executable computer instructions in the form physical states and/or signals (e.g., stored in memory states), for example. Computing device 602 may communicate with computing device 604 by way of a network connection, such as via network 608, for example. As previously mentioned, a connection, while physical, may not necessarily be tangible. Although computing device 604 of FIG. 6 shows various tangible, physical components, claimed subject matter is not limited to computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 622 may comprise any non-transitory storage mechanism Memory 622 may comprise, for example, primary memory 624 and secondary memory 626, additional memory circuits, mechanisms, or combinations thereof may be used. Memory 622 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 622 may be utilized to store a program of executable computer instructions. For example, processor 620 may fetch executable instructions from memory and proceed to execute the fetched instructions. Memory 622 may also comprise a memory controller for accessing device readable-medium 640 that may carry and/or make accessible digital content, which may include code, and/or instructions, for example, executable by processor 620 and/or some other device, such as a controller, as one example, capable of executing computer instructions, for example. Under direction of processor 620, a non-transitory memory, such as memory cells storing physical states (e.g., memory states), comprising, for example, a program of executable computer instructions, may be executed by processor 620 and able to generate signals to be communicated via a network, for example, as previously described. Generated signals may also be stored in memory, also previously suggested.

Memory 622 may store electronic files and/or electronic documents, such as relating to one or more users, and may also comprise a device-readable medium that may carry and/or make accessible content, including code and/or instructions, for example, executable by processor 620 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining" "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 6, processor 620 may comprise one or more circuits, such as digital circuits, to perform at least a portion of a computing procedure and/or process. By way of example, but not limitation, processor 620 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 620 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 604 as including a component 632 operable with input/output devices, for example, so that signals and/or states may be appropriately communicated between devices, such as device 604 and an input device and/or device 604 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of executing computer instructions on at least one computing device in which the at least one computing device includes at least one processor and at least one memory, comprising:
    fetching computer instructions from the at least one memory of the at least one computing device for execution on the at least one processor of the at least one computing device;
    executing the fetched computer instructions on the at least one processor of the at least one computing device; and
    storing in the at least one memory of the at least one computing device any results of having executed the fetched computer instructions on the at least one processor of the at least one computing device;
    wherein the computer instructions to be executed comprise instructions for electronic asset monitoring;
    wherein the executing the fetched computer instructions further comprises:
    determining a particular timing sequence for one or more visual status indicators (VSIs) of an electronic asset based, at least in part, on a duration of blinking, flashing, and/or illuminating of the one or more VSIs;
    generating, via an electronic asset monitoring system, one or more signals representative of digital media captured via a camera imager of the electronic asset monitoring system based, at least in part, on the determined particular timing sequence for the one or more VSIs of the electronic asset accessible over an electronic network; and
    communicating, via the electronic asset monitoring system and the electronic network, one or more messages comprising the captured digital media to a server for determining a status of the electronic asset, at least in part; and
    wherein the storing in the at least one memory of the at least one computing device any results of having executed the fetched computer instructions on the at least one processor of the at least one computing device comprises: storing the digital media in the at least one memory of the at least one computing device, the digital media resulting from the execution of the fetched computer instructions on the at least one processor of the at least one computing device.

2. The method of claim 1, wherein the electronic asset monitoring system comprises an enhanced machine-type communications (eMTC) category M1 (Cat-M1) device.

3. The method of claim 1, wherein the one or more messages are communicated according to at least one of the following: an LTE positioning protocol (LPP); an LPP extensions (LPPe) protocol; a Secure User Plane Location (SUPL) user plane location protocol (ULP); a Location Services Application Protocol (LCS-AP) control plane protocol, or any combination thereof.

4. The method of claim 1, wherein the particular timing sequence is defined, at least in part, via one or more image capture events.

5. The method of claim 4, wherein the one or more image capture events are measured temporally, or quantitatively, or spatially, or any combination thereof.

6. The method of claim 4, and further comprising adjusting the particular timing sequence based, at least in part, on the one or more image capture events.

7. The method of claim 1, wherein the particular timing sequence is used, at least in part, to anticipate a state change of the one or more VSIs.

8. The method of claim 1, wherein the particular timing sequence is defined, at least in part, via one or more intensity threshold values for the digital media.

9. The method of claim 1, wherein the particular timing sequence is determined for a plurality of different types of electronic assets.

10. The method of claim 1, wherein the electronic asset comprises an electronic cardiovascular device, or an electronic fire protection device, or any combination thereof.

11. The method of claim 1, wherein the digital media comprises one or more of the following: one or more still images; one or more video images; or any combination thereof.

12. The method of claim 1, wherein the status is determined, at least in part, via one or more image processing operations.

13. The method of claim 1, wherein the status is stored in a repository accessible via the electronic network.

14. The method of claim 1, wherein the status is being determined, at least in part, via the electronic asset monitoring system.

15. The method of claim 1, and further comprising transmitting one or more electronic notifications to one or more electronic devices based, at least in part, on the determined status, the one or more electronic notifications being transmitted via at least one of the following: the server; the electronic asset monitoring system; the electronic network; or any combination thereof.

16. An apparatus comprising:
    at least one computing device, the at least one computing device including at least one processor and at least one memory;
    the at least one computing device to execute computer instructions on the at least one processor, the computer instructions to be executed having been fetched from the at least one memory for execution on the at least one processor and the at least one computing device to store in the at least one memory of the at least one computing device any results to be generated from the execution on the at least one processor of the to be executed computer instructions;
    wherein the computer instructions to be executed to comprise instructions to implement asset monitoring via an electronic asset monitoring system;
    wherein the instructions to be executed as a result of the execution to:
    determine a particular timing sequence for one or more visual status indicators (VSIs) of an electronic asset based, at least in part, on a duration of blinking, flashing, and/or illuminating of the one or more VSIs;

generate, via the electronic asset monitoring system, one or more signals representative of digital media to be captured via a camera imager of the electronic asset monitoring system based, at least in part, on the determined particular timing sequence for the one or more VSIs of the electronic asset accessible over an electronic network; and initiate communication, via the electronic asset monitoring system and the electronic network, of one or more messages that comprise the captured digital media to a server so as to determine a status of the electronic asset, at least in part.

17. The apparatus of claim 16, wherein the particular timing sequence is to be defined, at least in part, via one or more image capture events.

18. The apparatus of claim 17, wherein the one or more image capture events are to be measured temporally, or quantitatively, or spatially, or any combination thereof.

19. The apparatus of claim 16, wherein the particular timing sequence is to be defined, at least in part, via one or more intensity threshold values for the digital media.

20. An article comprising:
a non-transitory computing storage medium having stored thereon instructions executable by at least one computing device, the at least one computing device comprising at least one processor and at least one memory to:

execute computer instructions on the at least one processor, the computer instructions to be executed having been fetched from the at least one memory for execution on the at least one processor and the at least one computing device to store in the at least one memory of the at least one computing device any results to be generated from the execution on the at least one processor of the to be executed computer instructions;

wherein the computer instructions to be executed to comprise instructions to implement asset monitoring via an electronic asset monitoring system;

wherein the instructions to be executed as a result of the execution to:

determine a particular timing sequence for one or more visual status indicators (VSIs) of an electronic asset based, at least in part, on a duration of blinking, flashing, and/or illuminating of the one or more VSIs;

generate, via the electronic asset monitoring system, one or more signals representative of digital media to be captured via a camera imager of the electronic asset monitoring system based, at least in part, on the determined particular timing sequence for the one or more VSIs of the electronic asset accessible over an electronic network; and initiate communication, via the electronic asset monitoring system and the electronic network, of one or more messages that comprise the captured digital media to a server so as to determine a status of the electronic asset, at least in part.

21. The article of claim 20, wherein the particular timing sequence is to be defined, at least in part, via at least one of the following: one or more image capture events; one or more intensity threshold values for the digital media; or any combination thereof.

22. A method of executing computer instructions on at least one computing device in which the at least one computing device includes at least one processor and at least one memory, comprising:

fetching computer instructions from the at least one memory of the at least one computing device for execution on the at least one processor of the at least one computing device;

executing the fetched computer instructions on the at least one processor of the at least one computing device; and storing in the at least one memory of the at least one computing device any results of having executed the fetched computer instructions on the at least one processor of the at least one computing device;

wherein the computer instructions to be executed comprise instructions for electronic asset monitoring;

wherein the executing the fetched computer instructions further comprises:

determining a particular timing sequence for one or more visual status indicators (VSIs) of an electronic asset based, at least in part, on a duration of blinking, flashing, and/or illuminating of the one or more VSIs;

monitoring, via an electronic asset monitoring system, a pixel stream representing generated signals from a camera imager of the electronic asset monitoring system based, at least in part, on the determined particular timing sequence;

measuring one or more pixel values based, at least in part, on the monitored pixel stream; and capturing, via the camera imager of the electronic asset monitoring system, digital media based, at least in part, on the one or more pixel values exceeding an intensity threshold; and wherein the storing in the at least one memory of the at least one computing device any results of having executed the fetched computer instructions on the at least one processor of the at least one computing device comprises: storing the digital media in the at least one memory of the at least one computing device, the digital media resulting from the execution of the fetched computer instructions on the at least one processor of the at least one computing device.

23. The method of claim 22, wherein the intensity threshold comprises the intensity threshold of the one or more VSIs.

24. The method of claim 23, wherein the intensity threshold is based, at least in part, on a VSI pixel baseline level determined for the one or more pixel values.

25. The method of claim 22, wherein the monitored pixel stream comprises a pixel stream in a raw pixel image format.

26. The method of claim 22, wherein the monitored pixel stream is monitored in real time or near real time.

27. The method of claim 22, wherein the one or more pixel values comprise cumulative pixel values.

28. The method of claim 22, wherein the measuring the intensity values of the one or more pixels comprises computing a running average of the intensity values of the one or more pixels.

29. The method of claim 22, wherein the one or more pixel values exceeding the intensity threshold are indicative of a state change of one or more VSIs of an electronic asset accessible over an electronic network.

30. An apparatus comprising:
at least one computing device, the at least one computing device including at least one processor and at least one memory;

the at least one computing device to execute computer instructions on the at least one processor, the computer instructions to be executed having been fetched from the at least one memory for execution on the at least one processor and the at least one computing device to store in the at least one memory of the at least one computing device any results to be generated from the execution on the at least one processor of the to be executed computer instructions;

wherein the computer instructions to be executed to comprise instructions to implement asset monitoring via an electronic asset monitoring system;

wherein the instructions to be executed as a result of the execution to:

determine a particular timing sequence for one or more visual status indicators (VSIs) of an electronic asset based, at least in part, on a duration of blinking, flashing, and/or illuminating of the one or more VSIs;

monitor, via the electronic asset monitoring system, a pixel stream to be representative of signals generated by a camera imager of the electronic asset monitoring system based, at least in part, on the determined particular timing sequence;

measure one or more pixel values based, at least in part, on the monitored pixel stream; and capture, via the camera imager of the electronic asset monitoring system, digital media based, at least in part, on the one or more pixel values that exceed an intensity threshold.

31. The apparatus of claim 30, wherein the intensity threshold comprises the intensity threshold of the one or more VSIs.

32. The apparatus of claim 31, wherein the intensity threshold of the one or more VSIs is to be based, at least in part, on a VSI pixel baseline level to be determined for the one or more pixel values.

33. An article comprising:

a non-transitory computing storage medium having stored thereon instructions executable by at least one computing device, the at least one computing device comprising at least one processor and at least one memory to:

execute computer instructions on the at least one processor, the computer instructions to be executed having been fetched from the at least one memory for execution on the at least one processor and the at least one computing device to store in the at least one memory of the at least one computing device any results to be generated from the execution on the at least one processor of the to be executed computer instructions;

wherein the computer instructions to be executed to comprise instructions to implement asset monitoring via an electronic asset monitoring system;

wherein the instructions to be executed as a result of the execution to:

determine a particular timing sequence for one or more visual status indicators (VSIs) of an electronic asset based, at least in part, on a duration of blinking, flashing, and/or illuminating of the one or more VSIs;

monitor, via the electronic asset monitoring system, a pixel stream to be representative of signals generated from a camera imager of the electronic asset monitoring system based, at least in part, on the determined particular timing sequence;

measure one or more pixel values based, at least in part, on the monitored pixel stream; and capture, via the camera imager of the electronic asset monitoring system, digital media based, at least in part, on the one or more pixel values that exceed an intensity threshold.

34. The article of claim 33, wherein the intensity threshold comprises the intensity threshold of the one or more VSIs.

35. The article of claim 34, wherein the intensity threshold of the one or more VSIs is to be based, at least in part, on a VSI pixel baseline level to be determined for the one or more pixel values.

36. The method of claim 1, wherein the particular timing sequence comprises a timing sequence determined for the electronic asset and one or more additional electronic assets based, at least in part, on a quantitative measure accounting for varying timing sequences applicable to the electronic asset and the one or more additional electronic assets.

\* \* \* \* \*